(12) United States Patent
Harada et al.

(10) Patent No.: US 11,378,245 B2
(45) Date of Patent: Jul. 5, 2022

(54) VEHICLE LAMP

(71) Applicant: KOITO MANUFACTURING CO., LTD., Tokyo (JP)

(72) Inventors: Tatsuhiko Harada, Shizuoka (JP); Yasuhisa Ogawa, Shizuoka (JP); Takahiro Totsuka, Shizuoka (JP); Kazuma Nagase, Shizuoka (JP); Naoki Kawauchi, Shizuoka (JP); Masaki Sugimoto, Shizuoka (JP); Koji Doke, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/734,208

(22) PCT Filed: May 30, 2019

(86) PCT No.: PCT/JP2019/021608
§ 371 (c)(1),
(2) Date: Dec. 1, 2020

(87) PCT Pub. No.: WO2019/230910
PCT Pub. Date: Dec. 5, 2019

(65) Prior Publication Data
US 2021/0222850 A1    Jul. 22, 2021

(30) Foreign Application Priority Data

Jun. 1, 2018 (JP) .............................. JP2018-105810
Jun. 1, 2018 (JP) .............................. JP2018-105811
(Continued)

(51) Int. Cl.
*F21S 41/29* (2018.01)
*F21S 45/50* (2018.01)
(Continued)

(52) U.S. Cl.
CPC ............. *F21S 41/29* (2018.01); *F21S 41/143* (2018.01); *F21S 41/19* (2018.01); *F21S 41/25* (2018.01);
(Continued)

(58) Field of Classification Search
None
See application file for complete search history.

(56) References Cited

U.S. PATENT DOCUMENTS

| 6,210,014 B1 | 4/2001 | Kubizne et al. |
| 2001/0003506 A1 | 6/2001 | Natsume |

(Continued)

FOREIGN PATENT DOCUMENTS

| CN | 1299029 A | 6/2001 |
| CN | 1354106 A | 6/2002 |

(Continued)

OTHER PUBLICATIONS

Office Action issued corresponding Chinese Application No. 201811036964.6, dated Feb. 22, 2021 (16 pages).
(Continued)

*Primary Examiner* — Elmito Breval
(74) *Attorney, Agent, or Firm* — Osha Bergman Watanabe & Burton LLP

(57) ABSTRACT

A light source unit provided with a light-emitting element as a light source is attached to a rear wall section of a housing. The light source unit is attached to the housing, in the state where a socket is inserted in an opening formed in the rear wall section and an elastic seal member attached to the front end of the socket is pressed against the rear wall section. A rib extending toward a lamp rear side so as to surround at least the upper half section of the opening is formed on the rear wall section of the housing.

18 Claims, 17 Drawing Sheets

(30) Foreign Application Priority Data

| Jun. 1, 2018 | (JP) | JP2018-105812 |
|---|---|---|
| Jun. 1, 2018 | (JP) | JP2018-105813 |
| Jun. 1, 2018 | (JP) | JP2018-105814 |
| Jun. 1, 2018 | (JP) | JP2018-105815 |

(51) Int. Cl.
| | |
|---|---|
| *F21S 41/25* | (2018.01) |
| *F21S 41/20* | (2018.01) |
| *F21S 45/33* | (2018.01) |
| *F21S 41/143* | (2018.01) |
| *F21S 41/19* | (2018.01) |
| *F21S 45/48* | (2018.01) |
| *F21V 17/12* | (2006.01) |

(52) U.S. Cl.
CPC ............... *F21S 41/28* (2018.01); *F21S 45/33* (2018.01); *F21S 45/48* (2018.01); *F21S 45/50* (2018.01); *F21V 17/12* (2013.01)

(56) References Cited

U.S. PATENT DOCUMENTS

| 2007/0133220 | A1 | 6/2007 | Watanabe et al. |
| 2007/0177401 | A1 | 8/2007 | Nakabayashi |
| 2010/0259153 | A1 | 10/2010 | Futami |
| 2011/0286228 | A1 | 11/2011 | Zanma |
| 2012/0257400 | A1 | 10/2012 | Shibata |
| 2015/0184819 | A1 | 7/2015 | Maliar et al. |
| 2016/0076757 | A1 | 3/2016 | Seki |
| 2017/0291532 | A1 | 10/2017 | Dinant et al. |
| 2017/0297479 | A1 | 10/2017 | Debert et al. |
| 2017/0370548 | A1 | 12/2017 | Dinant et al. |
| 2018/0328580 | A1 | 11/2018 | Tezuka et al. |

FOREIGN PATENT DOCUMENTS

| CN | 102466831 | A | 5/2012 |
| CN | 102734727 | A | 10/2012 |
| CN | 103244893 | A | 8/2013 |
| CN | 203298199 | U | 11/2013 |
| CN | 204026450 | U | 12/2014 |
| CN | 105008793 | A | 10/2015 |
| CN | 206310397 | U | 7/2017 |
| CN | 206361594 | U | 7/2017 |
| DE | 102014010650 | A1 | 8/2015 |
| EP | 1739346 | A1 | 1/2007 |
| EP | 2623370 | A2 | 8/2013 |
| FR | 3026462 | A1 | 4/2016 |
| JP | S55092538 | U | 6/1980 |
| JP | S60181804 | U | 12/1985 |
| JP | H08-064005 | A | 3/1996 |
| JP | 2003301826 | A | 10/2003 |
| JP | 2004192946 | A | 7/2004 |
| JP | 2007157624 | A | 6/2007 |
| JP | 2007207528 | A | 8/2007 |
| JP | 2010251013 | A | 11/2010 |
| JP | 2011171277 | A | 9/2011 |
| JP | 2011243520 | A | 12/2011 |
| JP | 2015069699 | A | 4/2015 |
| JP | 2015118779 | A | 6/2015 |
| JP | 2015522929 | A | 8/2015 |
| JP | 2017-112283 | A | 6/2017 |

OTHER PUBLICATIONS

Partial European Search Report issued in corresponding application No. 19810840.9 dated Jun. 8, 2021 (17 pages).
International Search Report issued International Application No. PCT/JP2019/021608, dated Aug. 20, 2019 (5 pages).
Written Opinion issued International Application No. PCT/JP2019/021608, dated Aug. 20, 2019 (19 pages).
Office Action issued corresponding Chinese Application No. 201811062099.2, dated Jun. 22, 2020 (7 pages).
Office Action issued in corresponding Chinese Application No. 201811036050.X, dated Nov. 3, 2021 (14 pages).

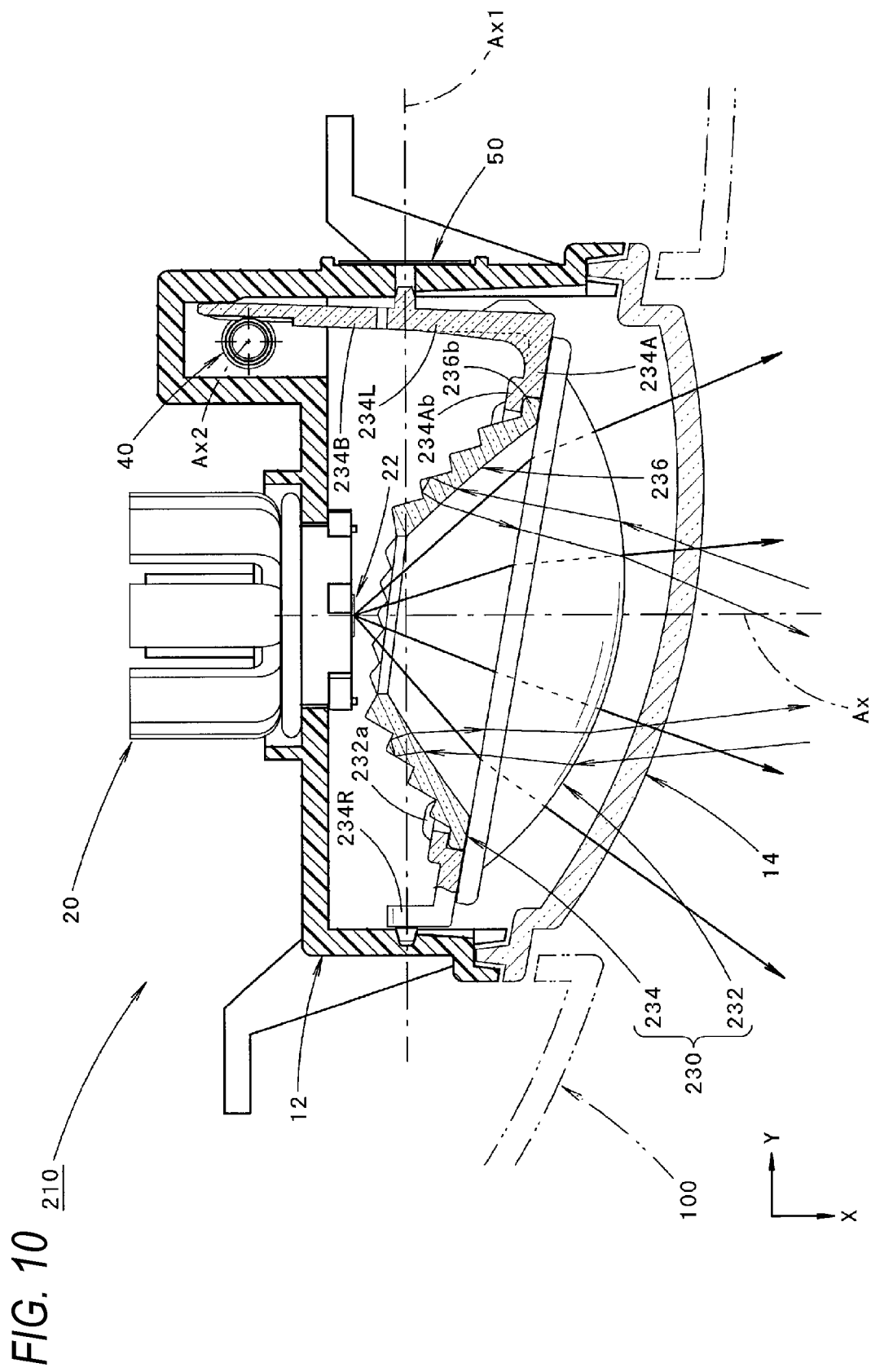

VEHICLE LAMP

TECHNICAL FIELD

The present disclosure relates to a vehicle lamp which is configured to control light distribution of light from a light source by a projection lens.

BACKGROUND ART

A vehicle lamp which is configured to control light distribution of light from a light source by a projection lens is known.

JP-T-2015-522929 has described a vehicle lamp including a lens in which an optical portion and a turning portion are integrally molded. The vehicle lamp is a lens-movable vehicle lamp whose turning portion is supported in a manner that allows the turning portion to rotate in an up-down direction with respect to a housing.

A light source of such a vehicle lamp is constituted by a light emitting element. The light emitting element is supported by a rear wall portion of the housing via a board and a heat sink.

An air hole, which is configured to absorb pressure fluctuation in a lamp chamber formed by the housing and a translucent cover, is formed in the rear wall portion of the housing.

The lens holder is rotated around a rotation axis extending in a vehicle width direction by an optical axis adjusting screw supported by the housing.

A pair of protruding pieces that extend toward a lamp rear side are formed at vehicle width direction end portions of the lens holder. The optical axis adjusting screw is screwed in groove portions formed on surfaces, which face each other, of the two protruding pieces.

CITATION LIST

Patent Literature

Patent Literature 1: JP-T-2015-522929

SUMMARY OF INVENTION

Problem to be Solved

An object of the present disclosure is to provide a vehicle lamp that includes a light source unit capable of preventing water from entering a lamp chamber.

Another object of the present disclosure is to provide a vehicle lamp that can improve appearance when a lamp is not lighted.

Another object of the present disclosure is to provide a vehicle lamp that can easily form an air hole configured to absorb pressure fluctuation in a lamp chamber.

Another object of the present disclosure is to provide a vehicle lamp that includes a rotationally-mounted light source unit capable of maintaining a shape of a light distribution pattern in a desired shape.

Another object of the present disclosure is to provide a vehicle lamp that can prevent a lens holder supporting a projection lens from being detached from a housing.

Another object of the present disclosure is to provide a vehicle lamp that can improve lamp assembling efficiency.

Means for Solving the Problem

A vehicle lamp according to one aspect of the present disclosure includes a light source unit which includes a light emitting element, a board where the light emitting element is mounted, a socket configured to support the board, and an elastic seal member mounted on a front end portion of the socket, a projection lens configured to control light distribution of light from the light emitting element, a lens holder configured to support the projection lens, and a housing configured to support the lens holder such that the lens holder is rotatable around a rotation axis extending in a vehicle width direction.

The light source unit is mounted to the housing in a state where the socket is inserted into an opening formed in a rear wall portion of the housing while the elastic seal member is pressed against the rear wall portion.

A rib which extends toward a lamp rear side is formed on the rear wall portion of the housing so as to surround at least an upper half portion of the opening.

A vehicle lamp according to another aspect of the present disclosure includes a projection lens configured to control light distribution of light from a light source, a lens holder configured to support the projection lens, a housing configured to support the lens holder such that the lens holder is rotatable around a rotation axis extending in a vehicle width direction, and a reflective member arranged on a lamp rear side relative to the projection lens.

The reflective member includes a plurality of reflecting elements configured to reflect external light, which has passed through the projection lens and entered an internal space of the housing, toward the projection lens.

The plurality of reflecting elements are formed at a portion which overlaps a peripheral edge portion of the projection lens in a lamp front view.

A vehicle lamp according to another aspect of the present disclosure includes a projection lens configured to control light distribution of light from a light source, a lens holder configured to support the projection lens, a housing configured to support the lens holder such that the lens holder is rotatable around a rotation axis extending in a vehicle width direction, and a translucent cover supported by the housing.

An air hole is formed in a peripheral wall portion of the housing so as to absorb pressure fluctuation in a lamp chamber formed by the housing and the translucent cover.

A vehicle lamp according to another aspect of the present disclosure includes a light source unit which includes a light emitting element, a board where the light emitting element is mounted, a socket configured to support the board, and an elastic seal member mounted on a front end portion of the socket, a projection lens configured to control light distribution of light from the light emitting element, a lens holder configured to support the projection lens, and a housing configured to support the lens holder such that the lens holder is rotatable around a rotation axis extending in a vehicle width direction.

The light source unit is mounted on the housing by inserting the socket into an opening formed in a rear wall portion of the housing and rotating the socket.

The housing is provided with a reverse rotation prevention structure which is configured to abut against the socket so as to prevent the light source unit from rotating in a loosening direction from a predetermined mounting position.

A vehicle lamp according to another aspect of the present disclosure includes
a projection lens configured to control light distribution of light from a light source,
a lens holder configured to support the projection lens,
a housing configured to support the lens holder such that the lens holder is rotatable around a rotation axis extending in a vehicle width direction, and
an optical axis adjusting screw configured to rotate the lens holder around the rotation axis with respect to the housing.

The lens holder includes a protruding piece which extends toward a lamp rear side at one end portion in the vehicle width direction, a groove portion which is screwed with the optical axis adjusting screw is formed in an inner side surface of a rear region, which is located on the lamp rear side relative to the rotation axis, of the protruding piece.

The lens holder includes a first leg portion which extends toward the lamp rear side at the one end portion in the vehicle width direction, and a second leg portion which extends toward the lamp rear side at another end portion in the vehicle width direction, each of the first leg portion and the second leg portion including a fulcrum protruding portion which is formed on an outer side surface of a rear end portion.

The housing includes fulcrum engagement portions on two side wall portions thereof, the fulcrum engagement portions being configured to engage with the fulcrum protruding portions of the first leg portion and the second leg portion at positions on the rotation axis.

A detachment prevention protruding portion is formed on at least one of an outer side surface of a front region, which is located on a lamp front side relative to the rotation axis, of the protruding piece and an outer side surface of the first leg portion.

A vehicle lamp according to another aspect of the present disclosure includes
a projection lens configured to control light distribution of light from a light source,
a lens holder configured to support the projection lens, and
a housing configured to support the lens holder such that the lens holder is rotatable around a rotation axis extending in a vehicle width direction.

The lens holder includes, on each of two vehicle width direction end portions thereof, a leg portion which extends toward a lamp rear side, each of the leg portions including a fulcrum protruding portion on an outer side surface of a rear end portion thereof.

The housing includes fulcrum engagement portions on two side wall portions thereof, the fulcrum engagement portions being configured to engage with the fulcrum protruding portions of the leg portions at positions on the rotation axis.

A groove portion, which extends from the fulcrum engagement portion toward a lamp front side, is formed in an inner side surface of at least one of the two side wall portions of the housing.

A type of the vehicle lamp according to the present disclosure is not particularly limited. For example, a fog lamp or a head lamp can be adopted.

A type of the "light source" is not particularly limited. For example, a light emitting element such as a light emitting diode or a laser diode, a light source bulb or the like can be adopted.

A specific configuration of the "lens holder" is not particularly limited as long as the lens holder is supported in a manner that allows the rotation around the rotation axis extending in the vehicle width direction with respect to the housing.

The "peripheral edge portion" of the projection lens refers to a portion located around the light source in the lamp front view. The peripheral edge portion is also a portion where light for light distribution control from the light source to the projection lens reaches without being blocked by the reflective member.

A specific formation range of the "plurality of reflecting elements" is not particularly limited as long as the reflecting elements are formed in the portion that overlaps the peripheral edge portion of the projection lens in the lamp front view. A specific configuration for reflecting external light toward the projection lens is also not particularly limited.

The "peripheral wall portion of the housing" refers to a wall portion that surrounds the projection lens in the lamp front view.

A specific configuration of the "air hole" and a specific formation position of the peripheral wall portion are not particularly limited.

The "reverse rotation prevention structure" is not particularly limited as long as the reverse rotation prevention structure can abut against the socket and thus prevent the light source unit from rotating in the loosening direction from the predetermined mounting position.

A specific shape of the "detachment prevention protruding portion" and a specific formation position thereof are not particularly limited.

A specific shape of the "fulcrum engagement portion" is not particularly limited as long as the fulcrum engagement portion can engage with the fulcrum protruding portion.

A specific shape of the "groove portion" is not particularly limited as long as the groove portion extends from the fulcrum engagement portion toward the lamp front side.

Effects

In the vehicle lamp according to the present disclosure, the lens holder that supports the projection lens is supported in the manner that allows the up-down direction rotation with respect to the housing. Therefore, optical axis adjustment can be performed in the up-down direction in a state where the light source is fixed to the housing. Therefore, the vehicle lamp can have a compact configuration, and a vehicle lamp which is particularly suitable for a fog lamp or the like can be provided.

The light emitting element which serves as the light source is configured as a part of the light source unit including the socket that supports the board where the light emitting element is mounted. Therefore, a lamp configuration can be simplified.

The light source unit has a configuration in which the elastic seal member is mounted to the front end portion of the socket. The light source unit is mounted on the housing in the state where the socket is inserted into the opening formed in the rear wall portion of the housing and the elastic seal member is pressed against the rear wall portion of the housing. Therefore, a certain degree of water-tightness can be ensured.

The rib which extends toward the lamp rear side is formed on the rear wall portion of the housing so as to surround at least the upper half portion of the opening. Therefore, rainwater or high-pressure washing water during car washing can be prevented from entering the lamp chamber from a mounting portion where the light source unit is mounted to the housing.

In this way, according to the present disclosure, water can be prevented from entering the lamp chamber even when the light source unit is used in a lens-movable vehicle lamp which is configured to control light distribution of light from the light source by the projection lens.

Further, the rib may surround an entire circumference of the opening of the housing, and a cutout portion may be formed in a lower end portion of the rib. As a result, water can be effectively prevented from entering the lamp chamber and the water can also be prevented from accumulating on an inner peripheral surface of the rib.

Further, the rib may extend to the lamp rear side relative to a position where the elastic seal member is pressed against the rear wall portion of the housing. As a result, the rainwater is less likely to flow down to the mounting portion where the light source unit is mounted to the housing, and the high-pressure washing water during car washing is less likely to be applied to the mounting portion. As a result, the water can be effectively prevented from entering the lamp chamber.

Further, the light source unit can be mounted on the housing by inserting the socket of the light source unit into the opening of the housing and rotating the socket. In this case, a mark indicating a predetermined mounting position of the light source unit may be formed on an outer peripheral surface of the rib. As a result, the light source unit can be prevented from being mounted to the housing in an incomplete state. Therefore, water can be effectively prevented from entering the lamp chamber.

A specific shape of the "mark" is not particularly limited, and, for example, a convex-shaped mark or a concave-shaped mark may be adopted.

Further, a region, which is located on an inner peripheral side of the rib, of the rear wall portion of the housing can be displaced to a lamp front side with respect to a region located on an outer peripheral side. In this case, a length of the rib can be shortened in accordance with a difference of the displacement.

In the vehicle lamp according to the present disclosure, the reflective member configured to reflect the external light, which has passed through the projection lens and entered the internal space of the housing, is arranged on the lamp rear side relative to the projection lens. The reflective member has the configuration in which the plurality of reflecting elements that reflect the external light toward the projection lens are formed in the portion that overlaps the peripheral edge portion of the projection lens in the lamp front view. Therefore, the following operational effect can be obtained.

That is, when the vehicle lamp is observed from the lamp front side in a non-lighting state, the internal space of the housing is seen through the projection lens. At this time, the reflective member is illuminated and seen at a plurality of locations due to the external light. Therefore, the internal space of the housing can be prevented from being seen darkly even when the lamp is not lighted. As a result, visibility thereof as a vehicle lamp can be improved.

The plurality of reflecting elements are formed at the portion which overlaps the peripheral edge portion of the projection lens in the lamp front view. Therefore, light from the light source toward the projection lens can be prevented from being blocked due to an arrangement of the reflective member, or such blocking can be minimized.

In this way, according to the present disclosure, the visibility when the lamp is not lighted can be improved in the lens-movable vehicle lamp which is configured to control the light distribution of the light from the light source by the projection lens.

Further, the reflective member may be supported by the lens holder. As a result, the reflective member can be rotated in the up-down direction together with the lens holder and the projection lens. Therefore, the reflective member can be arranged close to the projection lens. As a result, more light can be reflected toward the lamp front side, so that the internal space of the housing can be illuminated and seen more brightly.

Further, if the reflective member is made of a transparent member, the reflection of the external light reflected by the plurality of reflecting elements can be performed by total reflection. Therefore, when the vehicle lamp is observed from the lamp front side in the non-lighting state, the reflective member can be illuminated and seen at the plurality of locations with a crystal feeling. As a result, the visibility thereof can be further improved when the lamp is not lighted.

Further, if the lens holder is made of a transparent member, external light that has passed through the lens holder also enters the internal space of the housing. Therefore, when the vehicle lamp is observed from the lamp front side in the non-lighting state, the internal space of the housing can be illuminated and seen more brightly.

Further, the reflective member may be molded integrally with the lens holder. As a result, the number of components of the vehicle lamp can be reduced while the above-described operational effect can still be obtained.

Further, the projection lens may be fixed to the lens holder by thermal caulking. As a result, support of the projection lens provided by the lens holder can be achieved by an inexpensive fixed structure.

It is also possible to adopt a configuration in which the thermal caulking is performed in a state where the reflective member is interposed between the projection lens and the lens holder. As a result, support of the reflective member can also be achieved by the inexpensive fixed structure.

In the vehicle lamp according to the present disclosure, the air hole configured to absorb the pressure fluctuation in the lamp chamber is formed in the peripheral wall portion of the housing. Therefore, even when a rotation mechanism configured to rotate the lens holder in the up-down direction is arranged in the lamp chamber, a space for forming the air hole can be easily secured.

In this way, according to the present disclosure, the air hole configured to absorb the pressure fluctuation in the lamp chamber can be easily formed in the lens-movable vehicle lamp which is configured to control the light distribution of the light from the light source by the projection lens.

When the light emitting element is employed as the light source, the light emitting element may be supported by the rear wall portion of the housing via the board. The light source unit including the light emitting element, the board where the light emitting element is mounted and the socket that supports the board may also be mounted on the rear wall portion of the housing. In this case, since a mounting region of the light source unit is required on the rear wall portion of the housing, the space for forming the air hole is more difficult to be secured, so that the configuration of the present disclosure is particularly effective.

Further, the air hole may be formed in a side wall portion located on a vehicle width direction inner side of the housing. As a result, the following operational effect can be obtained.

That is, a large number of vehicle lamps have a lamp configuration that extends along a shape of a vehicle body. A translucent cover thereof faces a vehicle width direction outer side and is inclined toward the lamp rear side. Therefore, a front-rear length of a side wall portion located on the vehicle width direction inner side of such a housing is relatively long. Therefore, by forming the air hole in the side wall portion on the vehicle width direction inner side, the space for forming the air hole in the peripheral wall portion of the housing can be easily secured.

Further, the pair of left and right fulcrum protruding portions can be formed at positions on the rotation axis on the lens holder, and the pair of left and right fulcrum engagement portions that engage with the pair of left and right fulcrum protruding portions may be formed at positions on the rotation axis on the two side wall portions of the housing. As a result, the lens holder can be supported to the housing with a simple configuration.

The fulcrum engagement portion formed on a side wall portion located on the vehicle width direction inner side among the pair of left and right fulcrum protruding portions can be configured as a fulcrum engagement hole which penetrates the side wall portion in the vehicle width direction. As a result, a structure of a mold for molding the housing can be simplified.

The "fulcrum engagement hole" may be formed as a hole independent of the air hole, or may also be formed as a hole communicating with the air hole.

Further, a filter that is waterproof and moisture diffusive can be mounted on the side wall portion located on the vehicle width direction inner side of the housing so as to close the air hole and the fulcrum engagement hole. As a result, moisture generated in the lamp chamber can be discharged by diffusing action, and thus dew condensation can be effectively prevented from occurring on an inner surface of the translucent cover. Moreover, such an effect can be achieved by mounting a single filter.

A specific configuration of the "filter" is not particularly limited as long as the filter is waterproof and moisture diffusive. If a filter formed in a sheet shape is employed, the vehicle lamp can be maintained in a compact configuration.

Further, an annular bead portion can be formed on the side wall portion located on the vehicle width direction inner side of the housing, and a region located on an inner peripheral side of the annular bead portion on the side wall portion can be formed as a flat portion. Further, the air hole and the fulcrum engagement hole may be formed in the flat portion. As a result, the annular bead portion can function as a positioning guide when the filter is mounted. Moreover, the mounted filter can become difficult to be detached.

Further, the filter can be formed in the sheet shape while a height of the annular bead portion is set to have a value larger than a thickness of the filter. As a result, the filter can be effectively prevented from being inadvertently detached.

Further, if the filter is made of expanded polytetrafluoroethylene, waterproof performance and moisture diffusivity can be sufficiently ensured.

Further, the annular bead portion can extend in an annular shape, and the filter can have a circular outer shape. As a result, the filter can be effectively prevented from being inadvertently detached.

Further, ventilation performance can be sufficiently ensured when the air hole has an opening shape larger than the fulcrum engagement hole.

In the vehicle lamp according to the present disclosure, the light source is configured as the light emitting element in the light source unit including the light emitting element, the board where the light emitting element is mounted, and the socket that supports the board. Therefore, the lamp configuration can be simplified.

The light source unit is mounted on the housing by inserting the socket of the light source unit into the opening formed in the rear wall portion of the housing and rotating the socket. Therefore, the light source can be accurately positioned relative to a lamp front-rear direction.

The housing is provided with the reverse rotation prevention structure which is configured to abut against the socket so as to prevent the light source unit from rotating in the loosening direction from the predetermined mounting position. Therefore, a shape of a light distribution pattern formed by the light from the light source emitted from the projection lens can be prevented from becoming different from a desired shape.

In this way, according to the present disclosure, the shape of the light distribution pattern can be maintained in the desired shape even when a rotationally-mounted light source unit is used in the lens-movable vehicle lamp which is configured to control the light distribution of the light from the light source by the projection lens.

Further, the light emitting element may have a configuration in which a plurality of white light emitting diodes are arranged adjacent to each other, and a light emitting surface of the light emitting element may extend laterally when the light source unit rotates to the predetermined mounting position. As a result, a laterally long light distribution pattern can be formed, and thus the vehicle lamp can be particularly suitable for a fog lamp or the like.

Further, the reverse rotation prevention structure can include an abutting member configured to abut against the socket of the light source unit, and a fastening member configured to fasten the abutting member to the rear wall portion of the housing. As a result, the light source unit can be prevented, by a simple configuration, from rotating in the loosening direction from the predetermined mounting position.

Further, the socket of the light source unit can include a socket body and a heat sink fixed to the socket body. An abutting member may be abutted against the heat sink of the light source unit. As a result, the following operational effect can be obtained.

That is, the heat sink is made of a hard metal member, and hardly deforms even when the abutting member is abutted against the heat sink. Therefore, the light source unit can be reliably prevented from rotating in the loosening direction from the mounting position.

Although a type of the "fastening member" is not particularly limited, the abutting member can be fastened with a simple configuration if the fastening member is constituted by a screw.

The screw can have a screw hole shape that only allows transmission of a rotational force in a direction in which the screw is tightened. As a result, the screw can be prevented from being detached due to an inadvertent driver operation after the vehicle lamp is assembled, while the light source unit can be prevented from rotating from the mounting position in the loosening direction.

Further, the abutting member can include a fastening portion fixed to the rear wall portion of the housing, and a pair of arm portions extending from the fastening portion. Further, if a tip end surface of the pair of arm portions is abutted against or close to the heat sink in a state where the fastening portion is fastened to the rear wall portion of the housing, positioning of the abutting member can be easily performed.

The heat sink can include a front end portion which is formed in a disk shape, and a plurality of heat dissipating fins which extend on an outer peripheral surface of the front end portion in a band shape toward the lamp rear side. The front end portion can be fixed to the socket body. Further, in a case where the being abutted against or close to of the tip end surface of the pair of arm portions with respect to the heat sink is performed with respect to a pair of heat dissipating fins which are located at a peripheral direction end portion among the plurality of heat dissipating fins, the positioning of the abutting member can be performed more easily.

Further, the pair of arm portions of the abutting member can extend along the outer peripheral surface of the front end portion of the heat sink in the state where the fastening portion is fastened to the rear wall portion of the housing. As a result, the pair of arm portions can be used as a guide when the abutting member is fixed to the rear wall portion of the housing.

Further, if the abutting member is formed of a plate-shaped member which is made of resin, the reverse rotation prevention structure can have a simple and lightweight configuration.

In the vehicle lamp according to the present disclosure, the leg portion which extends toward the lamp rear side is formed on each of the two vehicle width direction end portions of the lens holder. The fulcrum protruding portion is formed on the outer side surface of the rear end portion of each leg portion, and the fulcrum engagement portions that engage with the fulcrum protruding portions of the leg portions are formed at the positions on the rotation axis on the two side wall portions of the housing. As a result, a degree of freedom in a positional relationship between the rotation axis and the projection lens can be improved.

Meanwhile, the protruding piece which extends toward the lamp rear side at the one end portion in the vehicle width direction of the lens holder is formed, and the optical axis adjusting screw is screwed with the groove portion formed in the inner side surface of the rear region, which is located on the lamp rear side relative to the rotation axis, of the protruding piece. For convenience of molding such a lens holder, it is difficult to bring a position of a base end portion of the protruding piece close to the side wall portion of the housing. Therefore, a large gap is easily formed between the leg portion, which is located on the side of the protruding piece relative to the vehicle width direction, and the side wall portion of the housing. Therefore, when the lens holder is relatively displaced in the vehicle width direction due to vehicle vibration or the like, the fulcrum protruding portion of the leg portion located on a side opposite to the protruding piece relative to the vehicle width direction is easily detached from a state where the fulcrum protruding portion is engaged with the fulcrum engagement portion of the housing.

However, in the vehicle lamp according to the present disclosure, the detachment prevention protruding portion is formed on the outer side surface of the front region, which is located on the lamp front side relative to the rotation axis, of the protruding piece and/or the outer side surface of the leg portion located on the side of the protruding piece relative to the vehicle width direction. Therefore, even when the lens holder is relatively displaced in the vehicle width direction due to the vehicle vibration or the like, the detachment prevention protruding portion is abutted against the side wall portion of the housing, so that the fulcrum protruding portion of the leg portion located on the side opposite to the protruding piece can be prevented from being detached from the state where the fulcrum protruding portion is engaged with the fulcrum engagement portion of the housing. As a result, the lens holder can be prevented from being detached from the housing.

In this way, according to the present disclosure, the lens holder that supports the projection lens can be prevented from being detached from the housing in the lens-movable vehicle lamp which is configured to control the light distribution of the light from the light source by the projection lens.

Further, the leg portion located on the side of the protruding piece may be set to have a lamp front-rear direction length longer than that of the leg portion located on the side opposite to the protruding piece. In this case, since the fulcrum protruding portion of the leg portion located on the side opposite to the protruding piece is more easily detached from the state where the fulcrum protruding portion is engaged with the fulcrum engagement portion of the housing due to the vehicle vibration or the like, it is effective to employ the configuration of the present disclosure.

Further, the leg portion located on the side of the protruding piece can be formed into a tongue-like shape facing the lamp rear side, and the protruding piece can surround the leg portion at a position overlapping the leg portion relative to the vehicle width direction. As a result, a required width in the vehicle width direction of the vehicle lamp can be reduced.

The detachment prevention protruding portion may be formed at two locations, which are located on upper and lower sides of the leg portion located on the side of the protruding piece, of the protruding piece. Therefore, when the lens holder is relatively displaced in the vehicle width direction due to the vehicle vibration or the like, the detachment prevention protruding portion can be abutted against the side wall portion of the housing at the two upper and lower locations. As a result, the lens holder can be effectively prevented from being detached from the housing.

Further, a reinforcing rib can be formed on an inner side surface of the front region of the protruding piece and/or an inner side surface of the leg portion located on the side of the protruding piece. As a result, when the lens holder is relatively displaced in the vehicle width direction due to the vehicle vibration or the like, a risk of breakage of the protruding piece or the leg portion located on the side of the protruding piece can be reduced.

Further, a gap between the detachment prevention protruding portion and a side wall portion, which is located on the side of the protruding piece, of the housing can be set to a value smaller than an insertion depth by which the fulcrum protruding portion of the leg portion located on the side opposite to the protruding piece is inserted into the fulcrum engagement portion of the housing in a state where the fulcrum protruding portion is engaged with the fulcrum engagement portion. As a result, the fulcrum protruding portion can be prevented from being detached from the state where the fulcrum protruding portion is engaged with the fulcrum engagement portion.

In the vehicle lamp according to the present disclosure, the leg portion which extends toward the lamp rear side is formed on each of the two vehicle width direction end portions of the lens holder. The fulcrum protruding portion is formed on the outer side surface of the rear end portion of each leg portion. The fulcrum engagement portions that engage with the fulcrum protruding portions of the leg portions are formed at the positions on the rotation axis on the two side wall portions of the housing. Therefore, the degree of freedom in the positional relationship between the rotation axis and the projection lens can be improved.

Since the groove portion, which extends from the fulcrum engagement portion toward the lamp front side, is formed in the inner side surface of at least one of the two side wall portions of the housing, the following operational effect can be obtained.

That is, at the time of assembly of the lamp, the lens holder is inserted into the internal space of the housing from the lamp front side, and the fulcrum protruding portions of the pair of left and right leg portions are engaged with the pair of left and right fulcrum engagement portions. By inserting the lens holder in a state where the fulcrum protruding portions are engaged with the groove portion formed in at least one of the inner side surfaces, each of the fulcrum protruding portions can be easily engaged with each of the fulcrum engagement portions.

In this way, according to the present disclosure, lamp assembling efficiency can be improved in the lens-movable vehicle lamp which is configured to control the light distribution of the light from the light source by the projection lens.

Further, an up-down width of a front region of the groove portion can be set to a value larger than an up-down width of a rear region of the groove portion. As a result, the fulcrum protruding portion can be easily engaged with the front region whose up-down width is large, the fulcrum protruding portion can be moved toward the rear region whose up-down width is narrow, and the fulcrum protruding portion can be easily guided to the fulcrum engagement portion. Therefore, the lamp assembling efficiency can be further improved.

The groove portion may be formed such that the up-down width gradually increases toward the lamp front side. As a result, the fulcrum protruding portion engaged with the groove portion can be smoothly moved toward the lamp rear side. As a result, the lamp assembling efficiency can be further improved.

Further, a depth of the front region of the groove portion may be set to a value larger than a depth of the rear region. The fulcrum protruding portion can be easily engaged with the front region which is relatively deep, and the fulcrum protruding portion can be moved toward the rear region which is relatively shallow. As a result, guidance toward the fulcrum engagement portion can be easily performed. Therefore, the lamp assembling efficiency can be further improved.

The groove portion may gradually deepen toward the lamp front side. As a result, the fulcrum protruding portion can be smoothly moved along the groove portion toward the lamp rear side, and the lamp assembling efficiency can be further improved.

BRIEF DESCRIPTION OF THE DRAWINGS

FIG. 10 shows a second modification of the first embodiment, and is similar to FIG. 1.

DETAILED DESCRIPTION OF EMBODIMENTS

Embodiments of the present disclosure will be described below with reference to the drawings.

First, a first embodiment of the present disclosure will be described.

Figure 1:
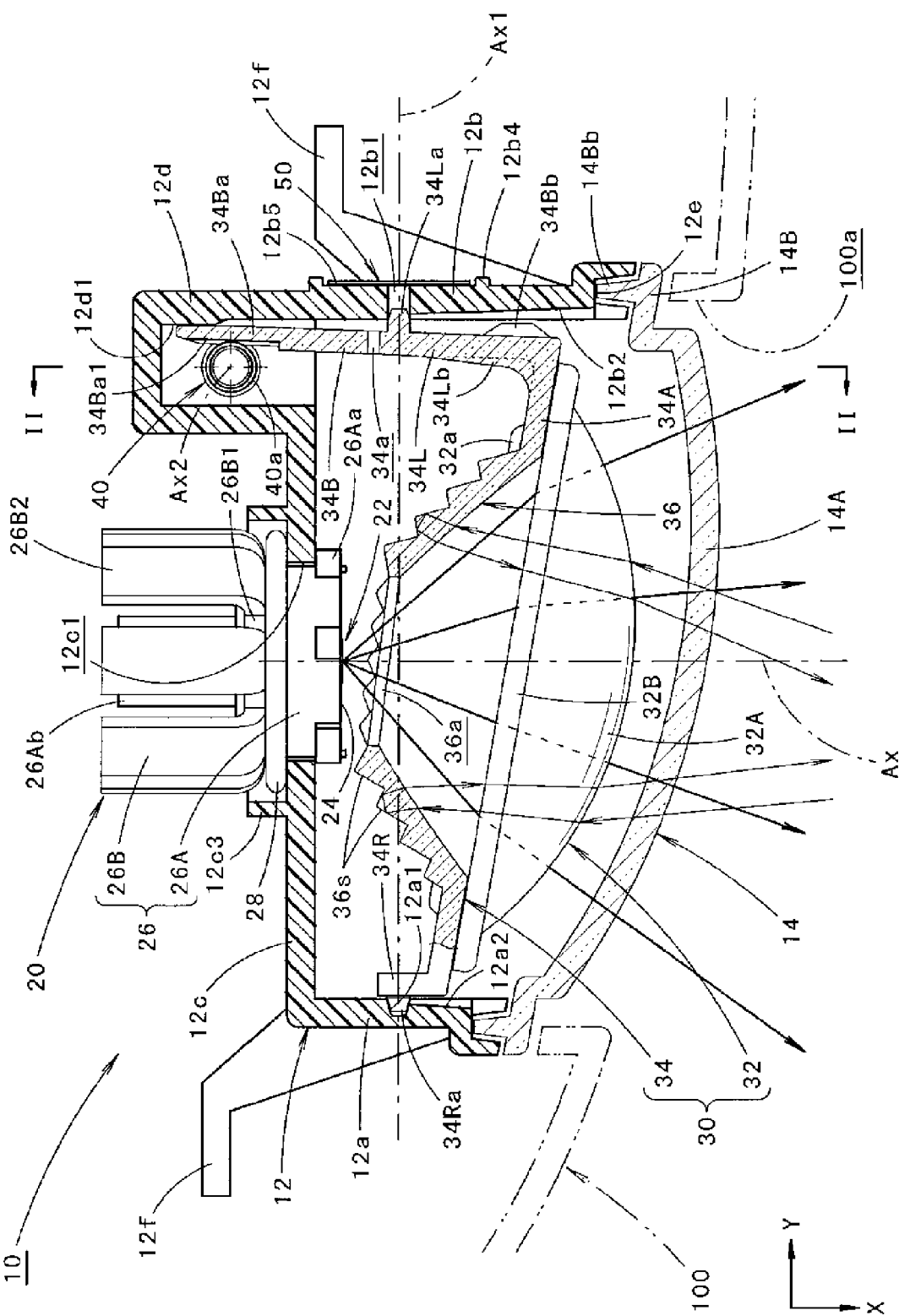
FIG. 1 is a plan sectional view showing a vehicle lamp according to a first embodiment of the present disclosure.
Figure 2:
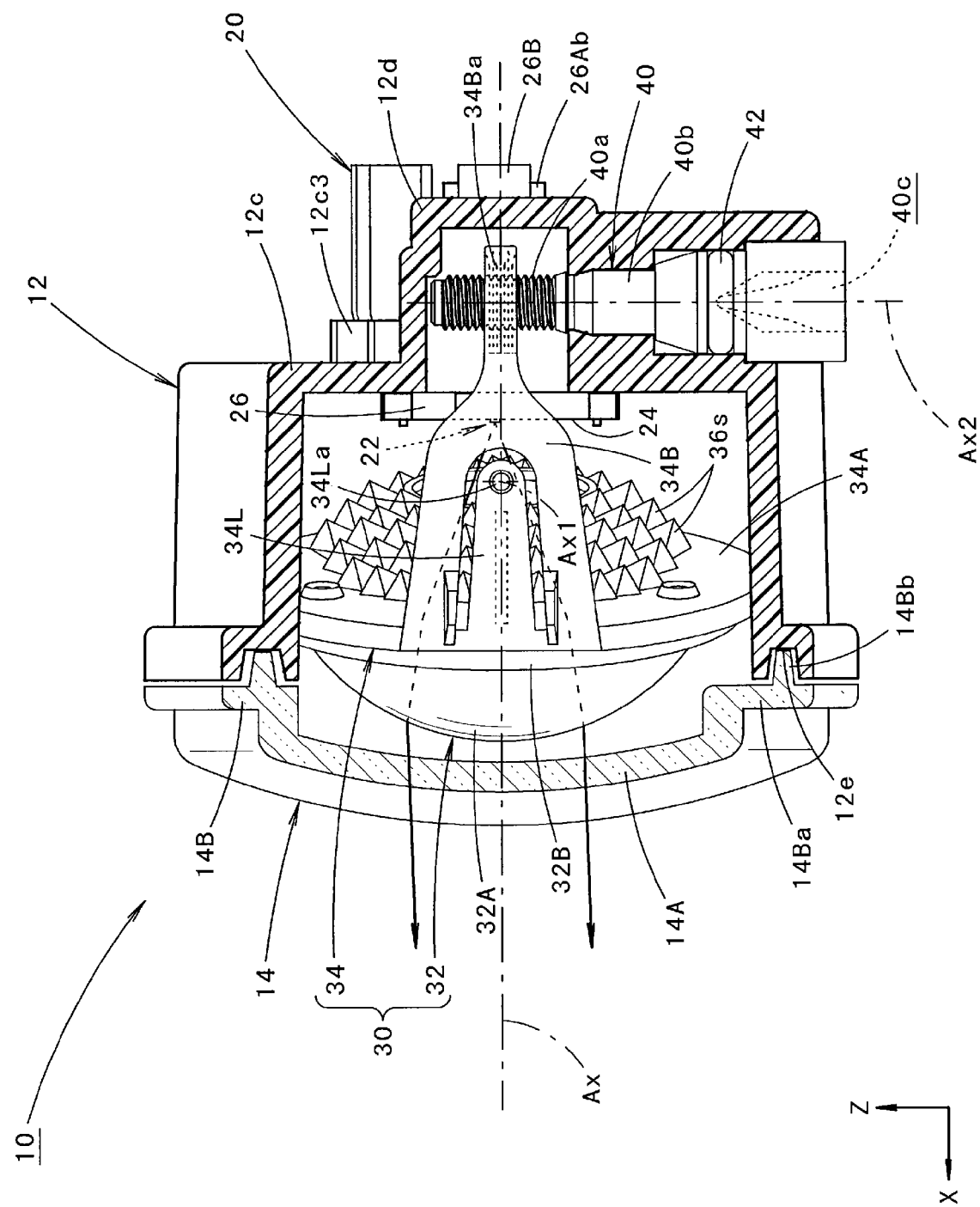
FIG. 2 is a partial sectional view taken along line II-II of FIG. 1.
Figure 3:
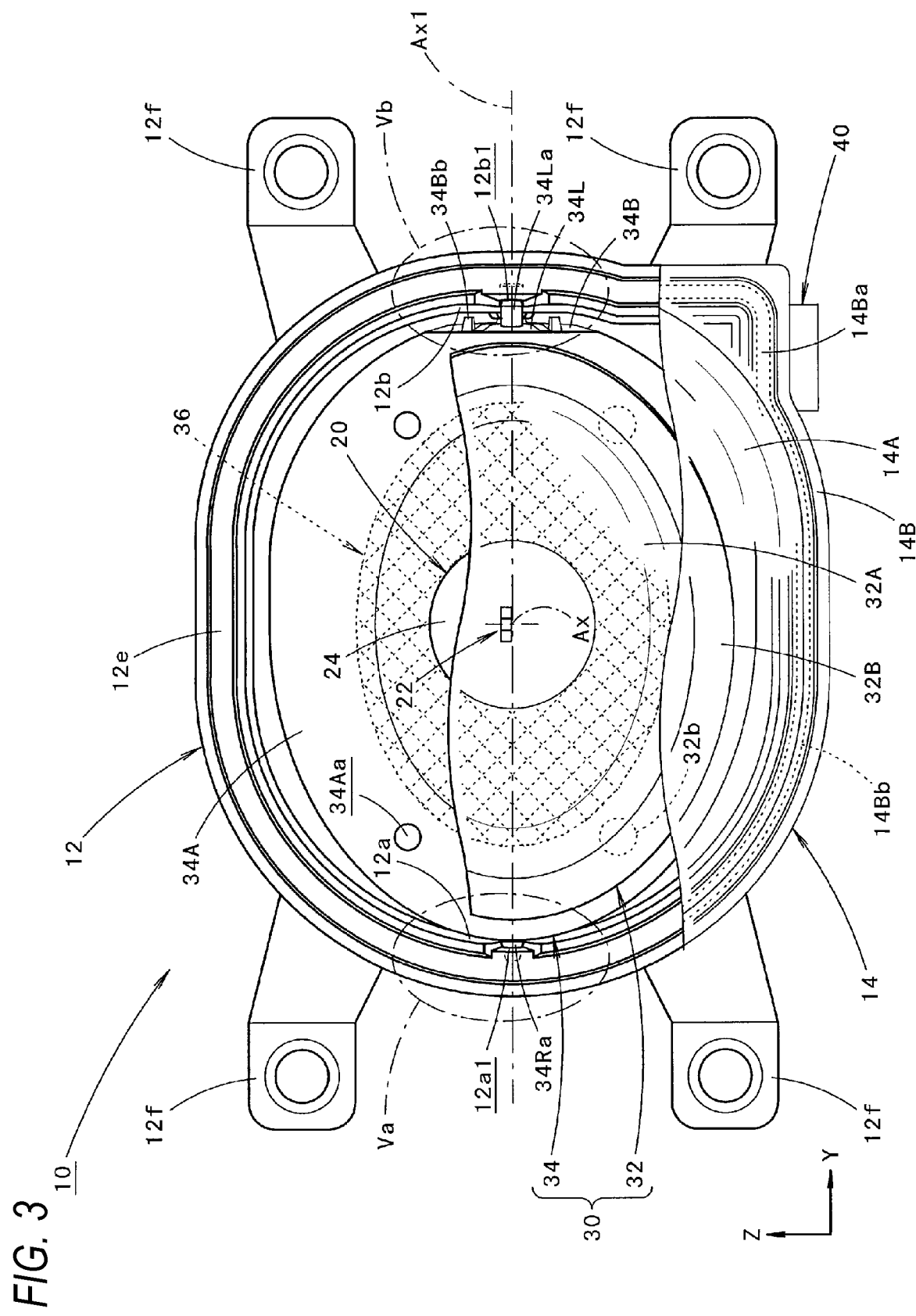
FIG. 3 is a front view showing the vehicle lamp.

FIG. 1 is a plan sectional view showing a vehicle lamp 10 according to the present embodiment. FIG. 2 is a partial sectional view taken along line II-II of FIG. 1. FIG. 3 is a front view showing the vehicle lamp 10. In FIG. 3, a part of constituent elements is shown in a broken state.

In these drawings, a direction indicated by X is a "front side" of a lamp (also a "front side" of a vehicle), a direction indicated by Y is a "left direction" that is orthogonal to the "front side" (also a "left direction" of the vehicle, and a "right direction" in a lamp front view), and a direction indicated by Z is an "up direction". The same also applies to the other drawings.

As shown in these drawings, the vehicle lamp 10 according to the present embodiment is a fog lamp provided at a right front end portion of the vehicle. The vehicle lamp 10 includes a housing 12, a translucent cover 14, a light emitting element 22, and a light distribution control unit 30. The light emitting element 22 and the light distribution control unit 30 are accommodated in a lamp chamber formed by the housing 12 and the translucent cover 14. The housing 12 functions as a lamp body. The translucent cover 14 is attached to a front end opening of the housing 12. The light distribution control unit 30 controls light distribution of light from the light emitting element 22 which serves as a light source.

The light distribution control unit 30 is supported in a manner that allows up-down direction rotation with respect to the housing 12. The light emitting element 22 is configured as a part of a light source unit 20 which is mounted on a rear wall portion 12c of the housing 12.

The translucent cover 14 includes a cover body portion 14A and an outer peripheral flange portion 14B which is located on an outer peripheral side of the cover body portion 14A. The cover body portion 14A has a laterally long circular outer shape in the lamp front view. The cover body portion 14A extends along a convex curved surface that is close to a spherical surface. The cover body portion 14A is arranged in a state of being inclined toward a lamp rear side from a left end portion thereof (right end portion in the lamp front view) toward a right end portion.

The outer peripheral flange portion 14B has a laterally long circular outer shape that is larger than the cover body portion 14A. An overhanging flange portion 14Ba is formed on a portion located at lower left of the outer peripheral flange portion 14B. The overhanging flange portion 14Ba has a right angle triangular shape which has two sides extending in a horizontal direction and a vertical direction. The overhanging flange portion 14Ba protrudes toward an outer peripheral side from a laterally long circular portion of the outer peripheral flange portion 14B.

By adopting a configuration in which the overhanging flange portion 14Ba is formed on the outer peripheral flange portion 14B in this way for the translucent cover 14, the translucent cover 14 is prevented from being erroneously assembled in an upside-down state. The translucent cover 14 is also prevented from being erroneously assembled between the vehicle lamp 10 and a fog lamp provided at a left front end portion of the vehicle (that is, a lamp to be paired with the vehicle lamp 10).

The housing 12 has the same outer shape as that of the translucent cover 14 in the lamp front view. The translucent cover 14 includes an annular protruding portion 14Bb which is formed on a rear surface of the outer peripheral flange portion 14B. The housing 12 includes an annular groove portion 12e which is formed in the front end opening thereof. The translucent cover 14 is fixed to the housing 12 in a state where the annular protruding portion 14Bb is inserted into the annular groove portion 12e. Such fixing is performed by ultrasonic welding in a state where a tip end portion of the annular protruding portion 14Bb is abutted against a bottom surface portion of the annular groove portion 12e.

The vehicle lamp 10 is attached to a vehicle body side member (not shown) in a state of being embedded in a vehicle bumper 100 (a member indicated by a two-dot chain line in FIG. 1).

Specifically, two pairs of left and right brackets 12f formed on the housing 12 of the vehicle lamp 10 is attached to the vehicle body side member in a state where the cover body portion 14A of the translucent cover 14 is exposed to an opening 100a formed in the bumper 100. An inner peripheral edge of the opening 100a of the bumper 100 has a laterally long circular shape which is slightly larger than an outer peripheral edge shape of the cover body portion 14A, so that most of the overhanging flange portion 14Ba of the outer peripheral flange portion 14B can be covered by the bumper 100.

Next, a specific configuration of the light distribution control unit 30 and a support structure for supporting the light distribution control unit 30 with respect to the housing 12 will be described.

The light distribution control unit 30 includes a projection lens 32 and a lens holder 34. The projection lens 32 deflects and controls direct light from the light emitting element 22. The lens holder 34 supports the projection lens 32.

The projection lens 32 is made of a colorless and transparent acrylic resin or the like. An optical axis Ax of the projection lens 32 extends in a lamp front-rear direction in the vicinity of a lower side of the light emitting element 22.

The projection lens 32 includes a lens body portion 32A and an outer peripheral flange portion 32B. A front surface of the lens body portion 32A is formed in a convex shape while a rear surface thereof is formed in a flat shape. The outer peripheral flange portion 32B is formed in an annular shape on an outer peripheral side of the lens body portion 32A so as to be flush with the rear surface of the lens body portion 32A. The projection lens 32 has a laterally long oval outer shape in the lamp front view. The projection lens 32 is arranged in a state of being inclined toward the lamp rear side from a left end portion thereof toward a right end portion. In the lens body portion 32A of the projection lens 32, direct light from the light emitting element 22 is emitted to a lamp front side as light that is slightly downward and spreads widely in a vehicle width direction. As a result, a light distribution pattern for a fog lamp is formed. A surface shape of the lens body portion 32A of the projection lens 32 is set such that a maximum diffusion angle of light emitted from the projection lens 32 toward a vehicle width direction outer side is larger than a maximum diffusion angle toward a vehicle width direction inner side.

The lens holder 34 is made of a transparent member such as a colorless and transparent polycarbonate resin. The lens holder 34 is formed such that an annular body portion 34A that supports an outer peripheral edge portion of the projection lens 32 extends obliquely toward the lamp rear side from a left end portion toward a right end portion along a rear surface of the projection lens 32. A pair of leg portions 34L and 34R that extend toward the lamp rear side are formed on two left and right side portions of the body portion 34A.

Support of the projection lens 32 provided by the lens holder 34 is performed by fixing the projection lens 32 to the lens holder 34 by thermal caulking at four locations. In order to achieve such fixing, caulking protruding portions 32a are formed at the four locations on a rear surface of the outer peripheral edge portion of the projection lens 32. Insertion holes 34Aa where the caulking protruding portions 32a are inserted are formed in the body portion 34A of the lens holder 34. In FIGS. 1 to 3, the caulking protruding portions 32a are shown in a state after the thermal caulking is performed.

In the vehicle lamp 10, external light passes through the translucent cover 14 and the projection lens 32 from the lamp front side and enters an internal space of the housing 12 (that is, a space located on the lamp rear side relative to the projection lens 32 in the lamp chamber). A reflective member 36 configured to reflect the external light is arranged on the lamp rear side relative to the projection lens 32.

The reflective member 36 is supported by the lens holder 34. Specifically, the reflective member 36 is molded integrally with the lens holder 34, and is thereby supported by the lens holder 34. Therefore, the reflective member 36 is also made of the transparent member such as the colorless and transparent polycarbonate resin.

The reflective member 36 is configured as an annular member extending from an outer peripheral edge portion of the body portion 34A of the lens holder 34 toward the lamp rear side toward in a direction that approaches the optical axis Ax. Specifically, the reflective member 36 is formed such that a front surface thereof extends along a curved surface which has an intermediate shape between a conical surface and an elliptical conical surface. An opening 36a which has an inner peripheral edge shape close to a circle centered on the optical axis Ax is formed in a rear end portion of the reflective member 36. The reflective member 36 is arranged with a positional relationship which prevents the light for light distribution control from the light emitting element 22 to the projection lens 32 from being blocked.

A plurality of reflecting elements 36s are formed on a rear surface of the reflective member 36 to reflect the external light that has passed the projection lens 32 and entered the internal space of the housing 12 toward the projection lens 32. That is, the plurality of reflecting elements 36s are formed at a portion which overlaps a peripheral edge portion of the lens body portion 32A of the projection lens 32 in the lamp front view. Each reflecting element 36s has a surface shape such as a triangular pyramid surface shape or a triangular prism surface shape, so that the external light reaching the reflecting element 36s can be totally reflected. That is, the reflective member 36 is configured such that a part of the reflecting elements 36s arranged at an angle where the external light is totally reflected toward an observation direction are illuminated and seen when the vehicle lamp 10 is observed from the lamp front side.

The light distribution control unit 30 is supported by the pair of left and right leg portions 34L and 34R of the lens holder 34 in a manner that allows rotation around a rotation axis Ax1 extending in the vehicle width direction (that is, a horizontal direction orthogonal to the optical axis Ax) with respect to the housing 12.

A specific configuration for achieving such a structure is as follows.

That is, the pair of left and right leg portions 34L and 34R are formed to extend in plate shapes from the two left and right side portions of the body portion 34A of the lens holder 34 in a plan view.

The pair of left and right leg portions 34L and 34R are formed to extend in tongue-like shapes extends from the body portion 34A of the lens holder 34 toward the lamp rear side in side views. As shown in FIG. 1, the pair of left and right leg portions 34L and 34R are formed to extend in directions that slightly expand from each other toward the lamp rear side with respect to a vertical plane extending in the lamp front-rear direction in a plan view. Since the body portion 34A of the lens holder 34 is inclined toward the lamp rear side from the left end portion toward the right end portion, the left leg portion 34L is formed to be longer (specifically, having a length of twice or more) than the right leg portion 34R. A reinforcing rib 34Lb configured to improve flexural rigidity of the leg portion 34L is formed on an inner side surface of the left leg portion 34L (that is, a side surface located on the side of the optical axis Ax).

Fulcrum protruding portions 34La and 34Ra which protrude outward are formed on the rotation axis Ax1 on outer side surfaces of rear end portions of the leg portions 34L and 34R. Each of the fulcrum protruding portions 34La and 34Ra is formed in a truncated cone shape, and a base end portion thereof is formed in a cylindrical shape. The base end portion of the left fulcrum protruding portion 34La is longer than the base end portion of the right fulcrum protruding portion 34Ra.

The fulcrum protruding portion 34Ra of the right leg portion 34R of the lens holder 34 is inserted into a fulcrum engagement recessed portion 12a1 formed in a right side wall portion 12a of the housing 12. The fulcrum protruding portion 34La of the left leg portion 34L of the lens holder 34 is inserted into a fulcrum engagement hole 12b1 formed in a left side wall portion 12b of the housing 12. As a result, the light distribution control unit 30 is supported in the manner that allows the rotation around the rotation axis Ax1 with respect to the housing 12.

That is, the fulcrum engagement recessed portion 12a1 constituting a right fulcrum engagement portion is formed as a truncated conical recessed portion in an inner side surface of the right side wall portion 12a of the housing 12. The fulcrum engagement hole 12b1 constituting a left fulcrum engagement portion is configured as a cylindrical through hole that penetrates the left side wall portion 12b of the housing 12 in the vehicle width direction.

A filter 50 configured to close the fulcrum engagement hole 12b1 is mounted on the left side wall portion 12b of the housing 12 from the side of an outer side surface of the left side wall portion 12b (which will be described later below).

Figure 4:
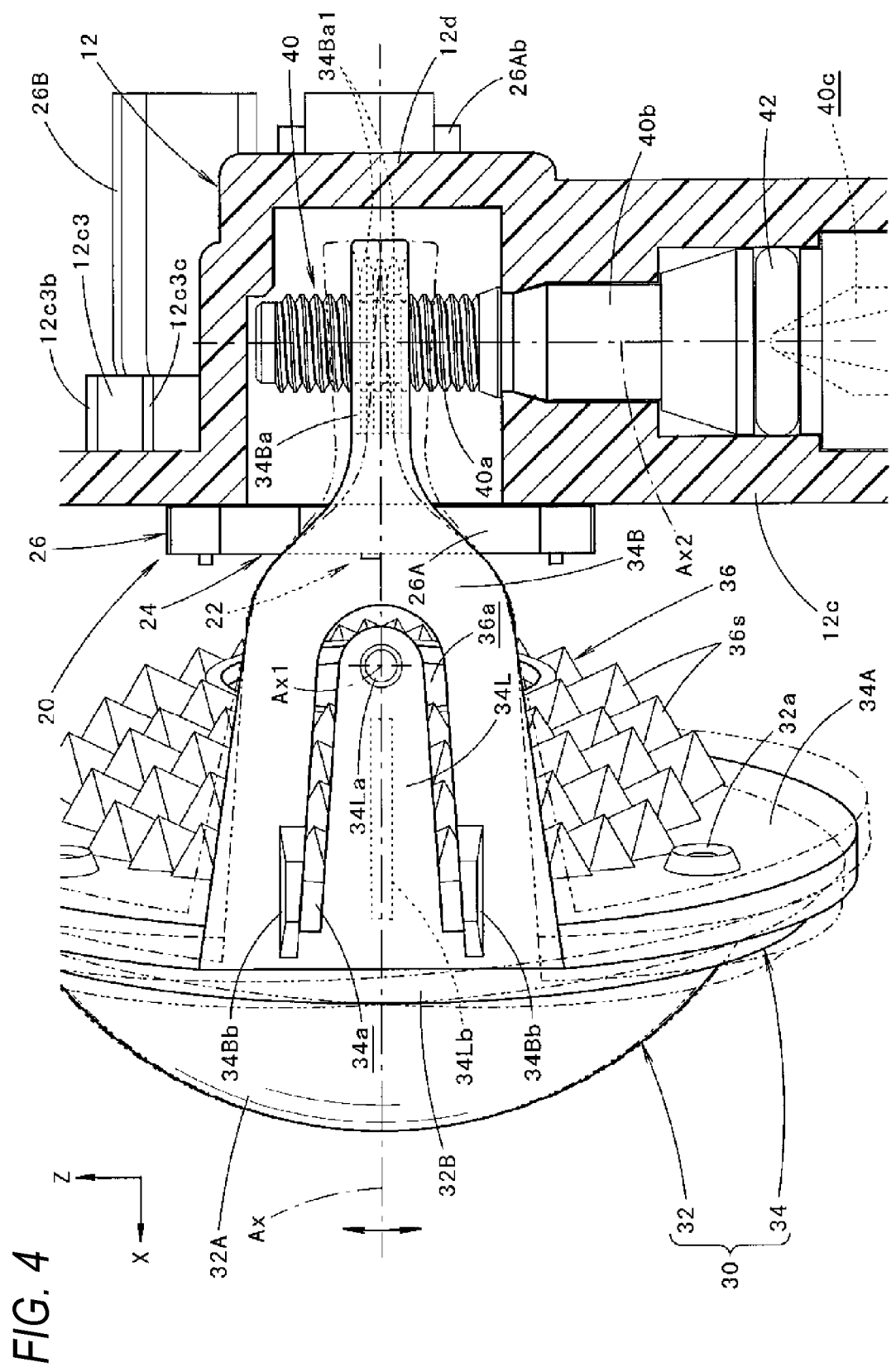
FIG. 4 is a main part detailed view of FIG. 2.

FIG. 4 is a main part detailed view of FIG. 2.

As also shown in FIG. 4, a left rear end portion of the housing 12 is configured as an overhanging portion 12d that overhangs from the rear wall portion 12c toward the lamp rear side. An optical axis adjusting screw 40 configured to rotate the light distribution control unit 30 around the rotation axis Ax1 is supported on a lower wall portion of the overhanging portion 12d in a manner that allows rotation around an axis Ax2 extending in the vertical direction.

The optical axis adjusting screw 40 is a member that is made of resin (for example, a polyamide resin). A diameter of the optical axis adjusting screw 40 gradually decreases from a lower end portion thereof to an upper end portion, and a screw portion 40a is formed at the upper end portion thereof. The screw portion 40a is constituted by a metric screw. A shaft portion 40b which is located in the middle of the optical axis adjusting screw 40 is supported by the housing 12 in a state where the screw portion 40a is exposed in the lamp chamber while the lower end portion is exposed to an external space.

A driver insertion hole 40c is formed in the lower end portion of the optical axis adjusting screw 40. By inserting a driver (not shown) into the driver insertion hole 40c and operating the driver, the optical axis adjusting screw 40 can be rotated around the axis Ax2. An O-ring 42 configured to ensure airtightness in the lamp chamber is mounted on the shaft portion 40b of the optical axis adjusting screw 40.

The lens holder 34 is formed with a protruding piece 34B that extends toward the lamp rear side on a left side portion of the lens holder 34. The protruding piece 34B extends in a plate shape on the same vertical plane as the left leg portion 34L. A rear end edge of the protruding piece 34B is located on the lamp rear side relative to the rotation axis Ax1 (further on the lamp rear side relative to the optical axis adjusting screw 40).

In a side view, a portion of the protruding piece 34B, which is located from the body portion 34A of the lens holder 34 to a position on the lamp rear side relative to the rotation axis Ax1, surrounds the left leg portion 34L via a substantially U-shaped slit 34a. A rear region 34Ba, which is located on the lamp rear side relative to such a portion, extends toward the lamp rear side with a substantially constant up-down width at the same height position as the optical axis Ax.

An outer side surface of the protruding piece 34B (a side surface on a side opposite to the optical axis Ax) is formed in a single plane shape. A step is formed on an intermediate portion of the rear region 34Ba on an inner side surface of the protruding piece 34B, and a portion located further on the lamp rear side is thinner than other portions (see FIG. 1). A plurality of (specifically, three) groove portions 34Ba1 configured to screw with the optical axis adjusting screw 40 are formed in an inner side surface of such a thin portion.

When the light distribution control unit 30 is in a rotation reference position which serves as a reference position of optical axis adjustment, the plurality of groove portions 34Ba1 are screwed with the screw portion 40a of the optical axis adjusting screw 40 around the same height position as the optical axis Ax.

Each groove portion 34Ba1 has a substantially wedge-shaped vertical cross-sectional shape and extends in the lamp front-rear direction. An up-down width thereof is set to the same value as a pitch of the screw portion 40a of the optical axis adjusting screw 40.

A portion near a rear end edge of an inner side surface of the rear region 34Ba of the protruding piece 34B is formed in a tapered shape in a plan view. As a result, rear end surfaces of the plurality of groove portions 34Ba1 are formed in a zigzag shape in a side view.

An inner side surface of the left side wall portion 12b of the housing 12 extends to the overhanging portion 12d while maintaining a smooth plane shape. A detachment prevention portion 12d1, which is configured to prevent each groove portion 34Ba1 of the protruding piece 34B from being detached from a screwed state where the groove portion 34Ba1 is screwed with the optical axis adjusting screw 40, is formed at a rear end portion of the overhanging portion 12d. A portion of a rear end portion of an inner side surface of the left side wall portion 12b is displaced further to the side of the inner side surface relative to other regions and is thicker, so that the detachment prevention portion 12d1 is formed in a positional relationship that is close to an outer side surface of the rear region 34Ba of the protruding piece 34B.

A pair of upper and lower detachment prevention protruding portions 34Bb are formed on an outer side surface of a front region, which is located on the lamp front side relative to the rotation axis Ax1, of the protruding piece 34B. Specifically, the pair of upper and lower detachment prevention protruding portions 34Bb are formed at positions adjacent to upper and lower sides of the substantially U-shaped slit 34a on a front end portion of the protruding piece 34B.

Each detachment prevention protruding portions 34Bb has a trapezoidal outer shape that is elongated in the lamp front-rear direction in a plan view. A tip end surface of each detachment prevention protruding portion 34Bb is formed to be close to the inner side surface of the left side wall portion 12b of the housing 12. A gap between the tip end surface of each detachment prevention protruding portion 34Bb and the inner side surface of the left side wall portion 12b of the housing 12 is set to a value smaller than an insertion depth by which the fulcrum protruding portion 34Ra of the right leg portion 34R of the lens holder 34 is inserted into the fulcrum engagement recessed portion 12a1 of the housing 12 in a state where the fulcrum protruding portion 34Ra is engaged with the fulcrum engagement recessed portion 12a1.

Figure 5A:
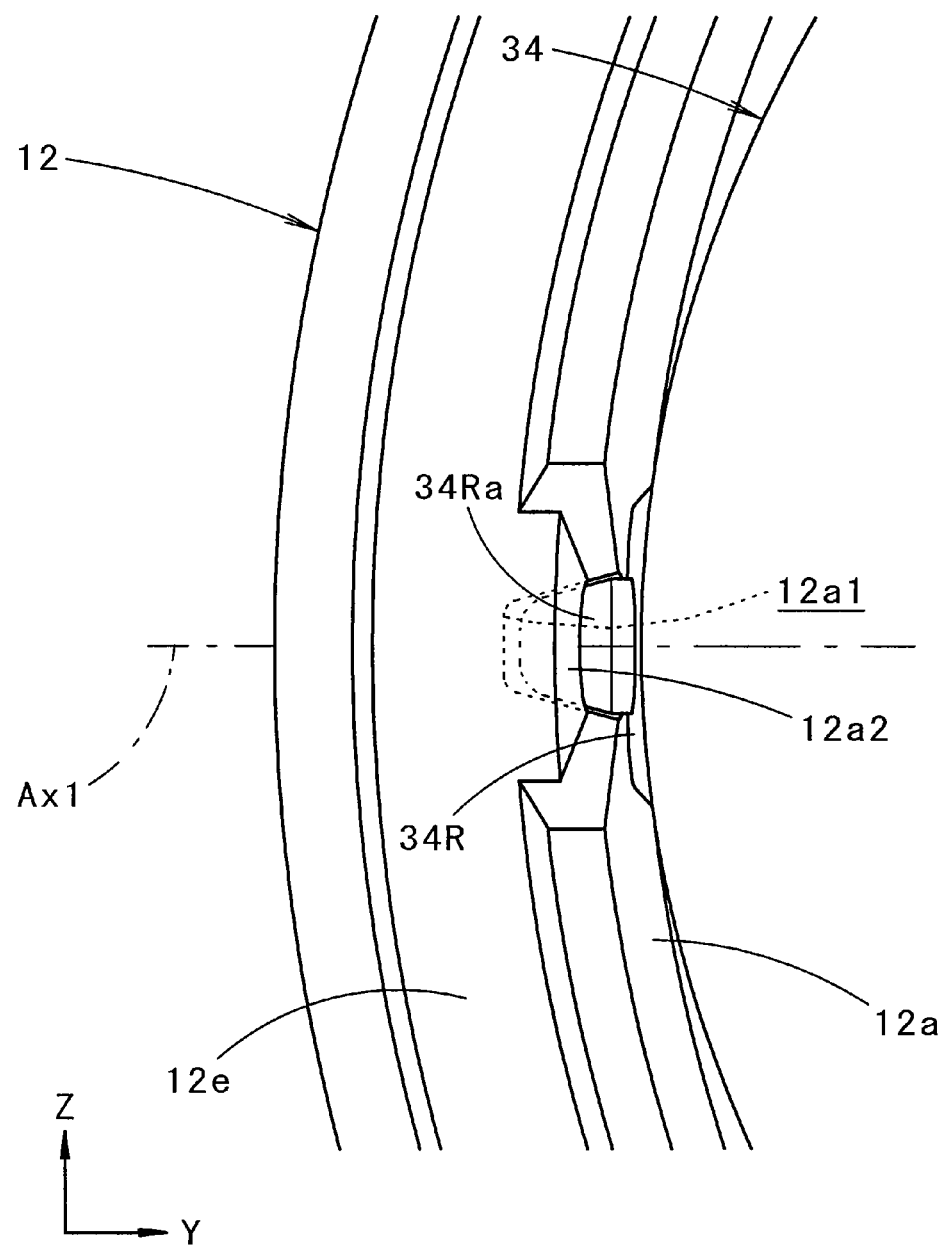
FIG. 5A is a detailed view of portion Va of FIG. 3.
Figure 5B:
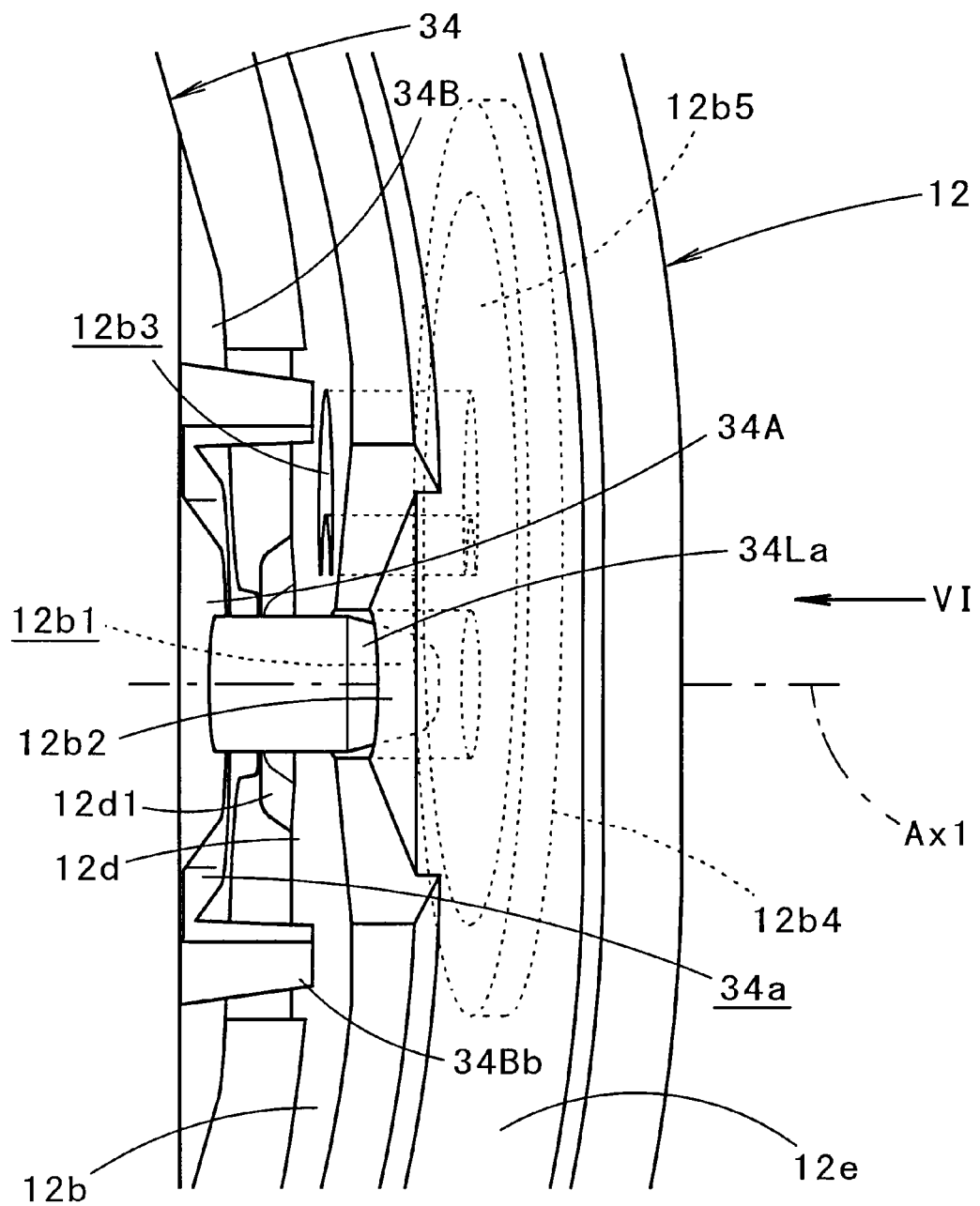
FIG. 5B is a detailed view of portion Vb of FIG. 3.

FIG. 5A is a detailed view of portion Va of FIG. 3. FIG. 5B is a detailed view of portion Vb of FIG. 3.

As shown in FIG. 5A, a groove portion 12a2 that extends from the fulcrum engagement recessed portion 12a1 toward the lamp front side is formed in the inner side surface of the right side wall portion 12a of the housing 12.

An up-down width of a front region of the groove portion 12a2 is set to a value larger than an up-down width of a rear region thereof. Specifically, the groove portion 12a2 is formed such that the up-down width thereof gradually increases toward the lamp front side. The up-down width at a rear end position of the groove portion 12a2 is set to the same value as an outer diameter of the base end portion of the fulcrum protruding portion 34Ra of the lens holder 34. The up-down width at a front end position of the groove portion 12a2 is set to a value of about 2 to 4 times the up-down width at the rear end position.

A depth of the front region of the groove portion 12a2 is set to a value larger than a depth of the rear region. Specifically, the groove portion 12a2 is formed such that the depth thereof gradually increases toward the lamp front side. A depth at the rear end position of the groove portion 12a2 is set to a value of about 0.2 to 0.6 times the insertion depth by which the fulcrum protruding portion 34Ra is inserted into the fulcrum engagement recessed portion 12a1. A depth at the front end position of the groove portion 12a2 is set to a value of about 0.6 to 1.2 times the insertion depth.

Meanwhile, as shown in FIG. 5B, a groove portion 12b2 that extends from the fulcrum engagement hole 12b1 toward the lamp front side is formed in the inner side surface of the left side wall portion 12b of the housing 12.

An up-down width of a front region of the groove portion 12b2 is set to a value larger than an up-down width of a rear region thereof. Specifically, the groove portion 12b2 is formed such that the up-down width thereof gradually increases toward the lamp front side. The up-down width at a rear end position of the groove portion 12b2 is set to the same value as an outer diameter of the base end portion of the fulcrum protruding portion 34La of the lens holder 34. The up-down width at a front end position of the groove portion 12b2 is set to a value of about 2 to 6 times the up-down width at the rear end position.

A depth of the front region of the groove portion 12b2 is set to a value larger than a depth of the rear region. Specifically, the groove portion 12b2 is formed such that the depth thereof gradually increases toward the lamp front side. A depth at the rear end position of the groove portion 12b2 is set to a value of about 0.2 to 0.6 times an insertion depth by which the fulcrum protruding portion 34La is inserted into the fulcrum engagement hole 12b1. A depth at the front end position of the groove portion 12b2 is set to a value of about 0.6 to 1.2 times the insertion depth.

Figure 6:
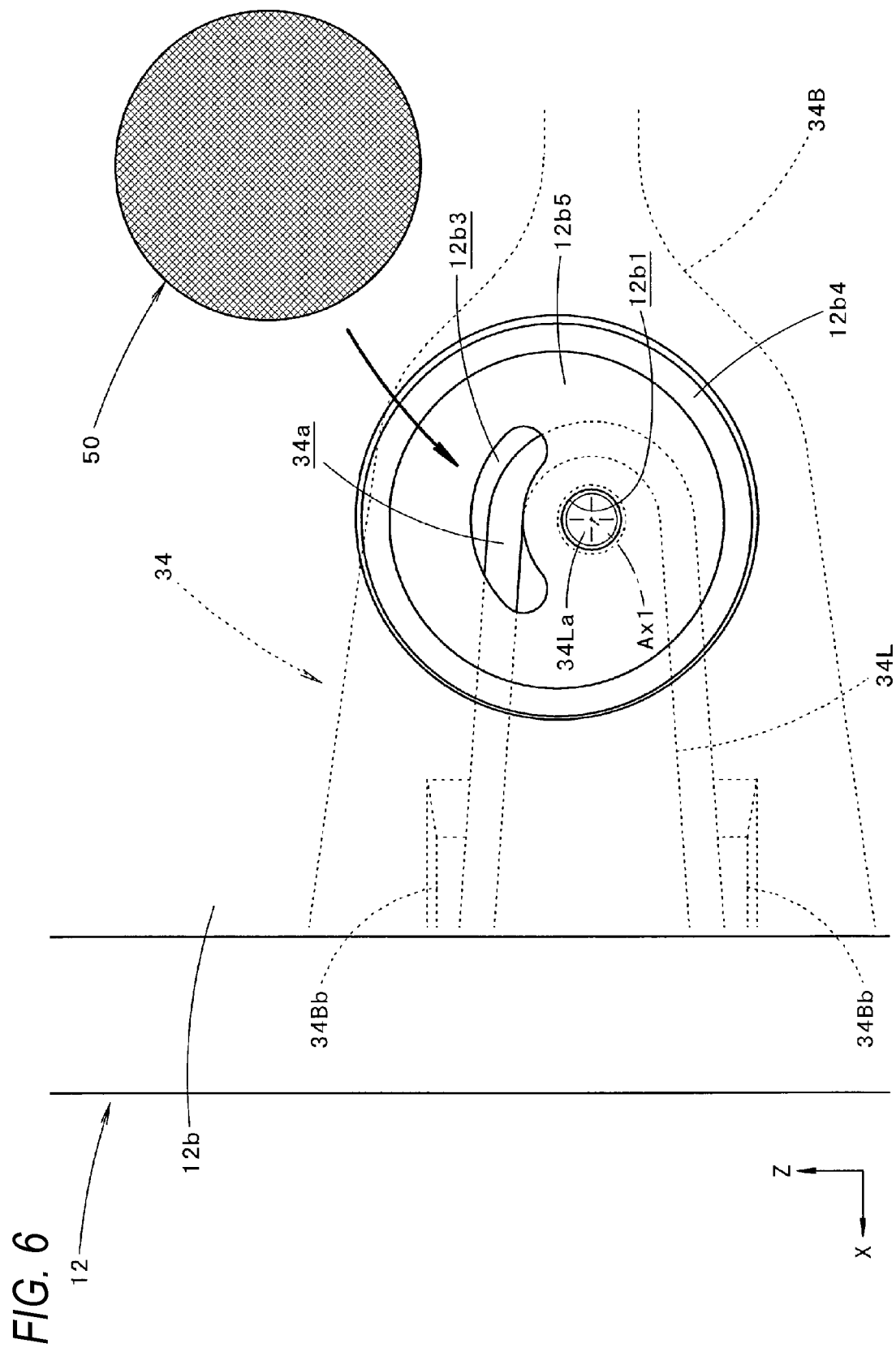
FIG. 6 shows a state where a filter is mounted to a housing of the vehicle lamp, and is taken along arrow VI of FIG. 5B.

FIG. 6 is taken along arrow VI of FIG. 5B, and shows a state where the filter 50 is mounted to the housing 12.

As shown in FIG. 6, the left side wall portion 12b of the housing 12 is formed with an air hole 12b3 that penetrates the left side wall portion 12b in the vehicle width direction above the fulcrum engagement hole 12b1. The air hole 12b3 is configured to absorb pressure fluctuation caused by a temperature change of gas in the lamp chamber. The air hole 12b3 surrounds the fulcrum protruding portion 34La in an arc shape, and has an opening shape larger than the fulcrum engagement hole 12b1.

The filter 50 configured to close the fulcrum engagement hole 12b1 and the air hole 12b3 is mounted on the left side wall portion 12b of the housing 12 from the side of the outer side surface thereof.

The filter 50 is configured as a sheet-shaped filter which is waterproof and moisture diffusive, and has a circular outer shape. The filter 50 is made of a sheet-shaped material having a thickness of several tens of μm, such as expanded polytetrafluoroethylene (ePTFE). The filter 50 has a configuration in which a plurality of micropores (for example, holes having a diameter of 10 μm or less) are formed in a mesh pattern.

An annular bead portion 12b4 that surrounds the fulcrum engagement hole 12b1 and the air hole 12b3 in an annular shape is formed on the outer side surface of the left side wall portion 12b. A height of the annular bead portion 12b4 is set to have a value larger than a thickness of the filter 50 (for example, a value of about 0.5 to 1 mm). A region located on an inner peripheral side of the annular bead portion 12b4 on the outer side surface of the left side wall portion 12b is formed as a flat portion 12b5.

Mounting of the filter 50 is achieved by attaching the filter 50 to the flat portion 12b5 on the inner peripheral side of the annular bead portion 12b4 on the outer side surface of the left side wall portion 12b of the housing 12. The annular bead portion 12b4 functions as a positioning guide when the filter 50 is attached to the left side wall portion 12b of the housing 12, and functions to prevent the filter 50 attached to the left side wall portion 12b from being peeled off.

Figure 7:
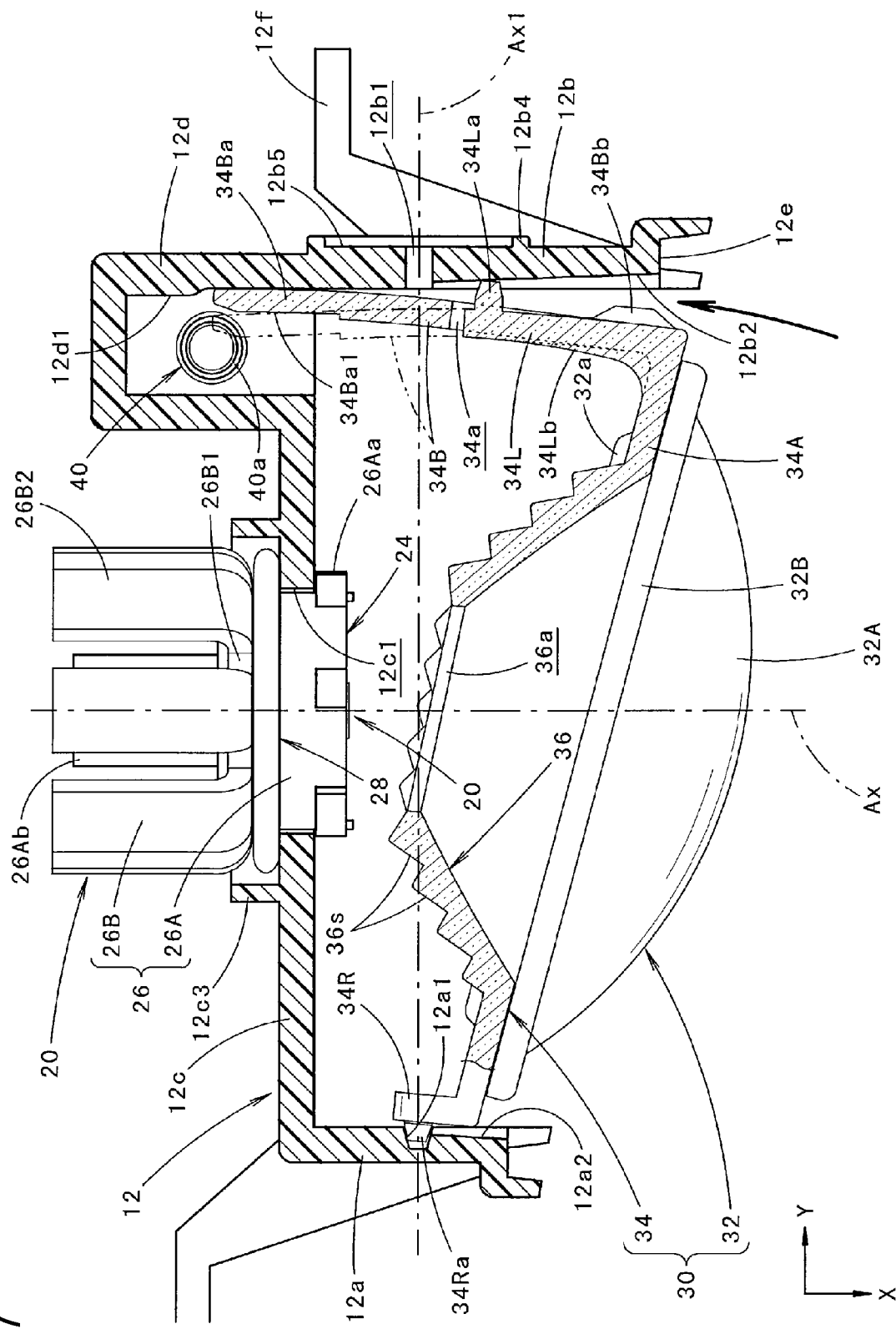
FIG. 7 is a plan sectional view showing a state where a lens holder is assembled to the housing of the vehicle lamp.

FIG. 7 is a plan sectional view showing a state where the lens holder 34 of the light distribution control unit 30 is assembled to the housing 12 in the present embodiment.

As shown in FIG. 7, in a state where the light distribution control unit 30 is inclined in a horizontal plane, a rear end portion of the protruding piece 34B of the lens holder 34 and the fulcrum protruding portion 34La of the left leg portion 34L are abutted against the inner side surface of the left side wall portion 12b of the housing 12 and are elastically deformed. In this state, the right leg portion 34R is inserted into the housing 12, and the fulcrum protruding portion 34Ra of the leg portion 34R is inserted into the fulcrum engagement recessed portion 12a1 of the right side wall portion 12a of the housing 12. Thereafter, the light distribution control unit 30 is pushed to rotate in a direction of an arrow around the vicinity of the fulcrum protruding portion 34Ra. As a result, the rear end portion of the protruding piece 34B and the fulcrum protruding portion 34La of the leg portion 34L are moved toward the lamp rear side along the inner side surface of the left side wall portion 12b of the housing 12. After the rear end portion of the protruding piece 34B rides on the detachment prevention portion 12d1 formed at the rear end portion of the inner side surface of the left side wall portion 12b, the fulcrum protruding portion 34La of the leg portion 34L is inserted into the fulcrum engagement hole 12b1 of the left side wall portion 12b.

As a result, the light distribution control unit 30 is supported in the manner that allows the rotation around the rotation axis Ax1 with respect to the housing 12. At this time, the plurality of groove portions 34Ba1 formed in the inner side surface of the protruding piece 34B are screwed with the screw portion 40a of the optical axis adjusting screw 40, while the outer side surface of the protruding piece 34B is brought close to the detachment prevention portion 12d1 of the housing 12.

Since the groove portion 12a2 that extends from the fulcrum engagement recessed portion 12a1 toward the lamp front side is formed in the inner side surface of the right side wall portion 12a of the housing 12, the fulcrum protruding portion 34Ra is engaged with the groove portion 12a2 when the right leg portion 34R is inserted inside the housing 12, so that the fulcrum protruding portion 34Ra can be moved toward the lamp rear side in a state of being guided in the up-down direction. As a result, insertion into the fulcrum engagement recessed portion 12a1 can be easily performed.

The groove portion 12b2 that extends from the fulcrum engagement hole 12b1 toward the lamp front side is formed in the inner side surface of the left side wall portion 12b of the housing 12. Therefore, the fulcrum protruding portion 34La is engaged with the groove portion 12b2 when the left leg portion 34L is inserted inside the housing 12, so that the fulcrum protruding portion 34La can be moved toward the lamp rear side in a state of being guided in the up-down direction. As a result, insertion into the fulcrum engagement hole 12b1 can be easily performed.

As shown by a two-dot chain line in FIG. 7, the protruding piece 34B and the left leg portion 34L are assumed to be integrally formed (elastically deformed integrally) as a configuration of the lens holder 34. In this case, when the fulcrum protruding portion 34La of the leg portion 34L is abutted against the inner side surface of the left side wall portion 12b of the housing 12, the protruding piece 34B is separated from the inner side surface of the left side wall portion 12b, and the rear end portion thereof interferes with the optical axis adjusting screw 40. However, in the lens holder 34 of the present embodiment, the protruding piece 34B and the left leg portion 34L are elastically deformed independently of each other. Therefore, the light distribution control unit 30 is smoothly assembled without causing such a problem.

Next, a specific configuration of the light source unit 20 and a mounting structure configured to mount the light source unit 20 to the housing 12 will be described.

Figure 8:
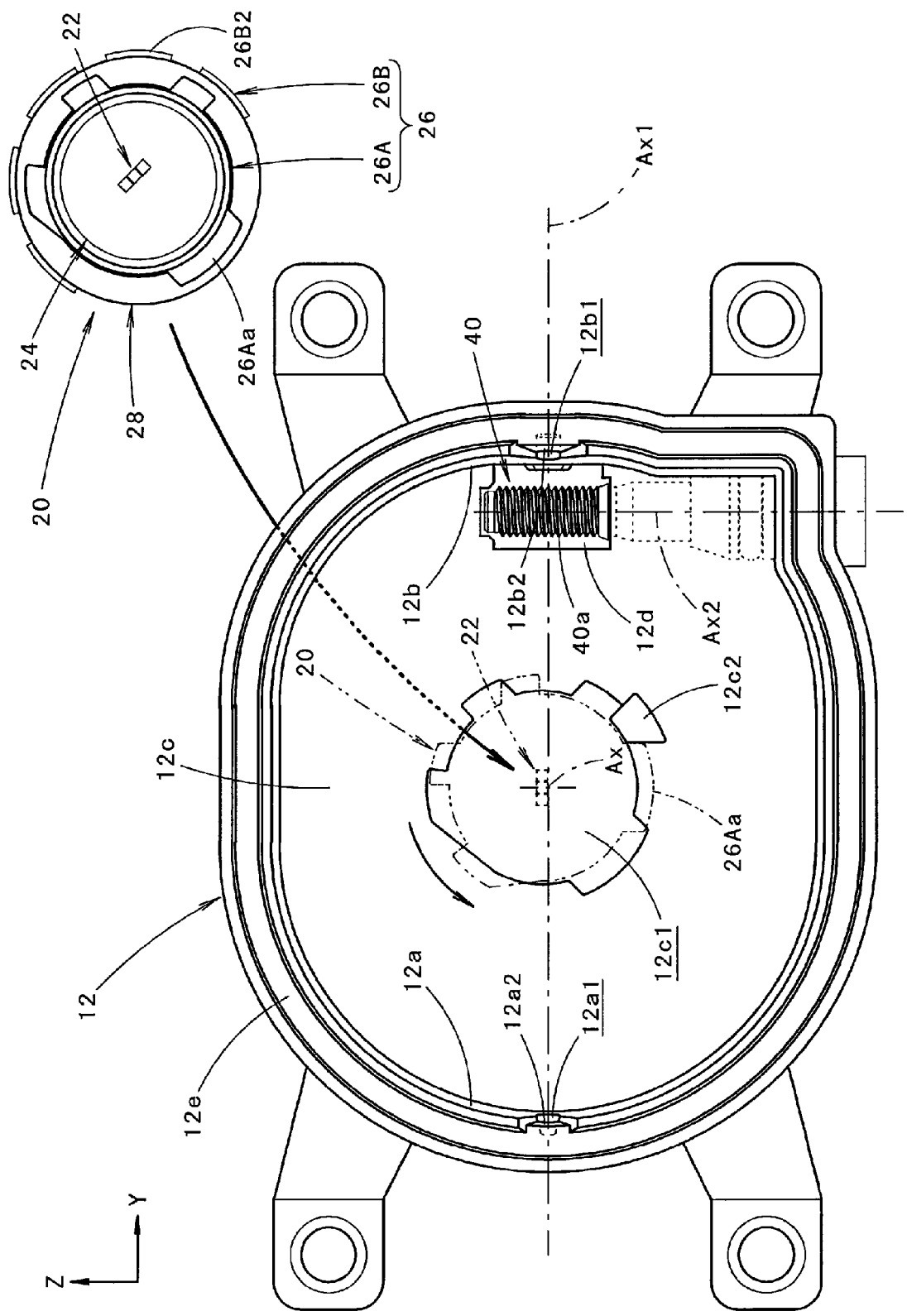
FIG. 8 is a front view showing a state where a light source unit is assembled to the housing of the vehicle lamp.
Figure 9A:
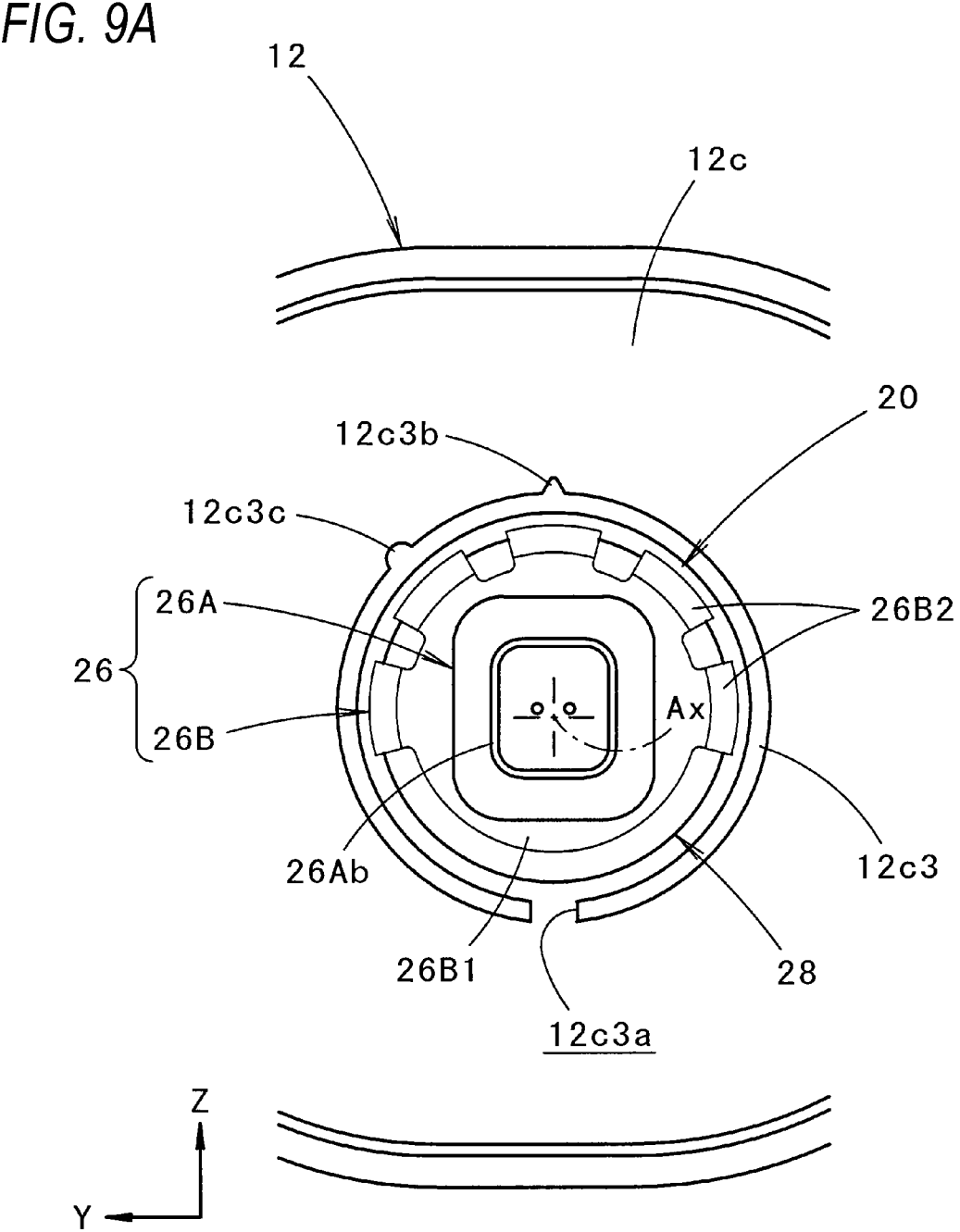
FIG. 9A is a rear view partially showing the vehicle lamp.

FIG. 8 is a front view showing a state where the light source unit 20 is assembled to the housing 12 of the vehicle lamp 10. FIG. 9A is a rear view partially showing the vehicle lamp 10.

As shown in FIG. 8, an opening 12c1 configured to mount the light source unit 20 is formed in the rear wall portion 12c of the housing 12.

The light source unit 20 includes a board 24 where the light emitting element 22 is mounted, and a socket 26 that supports the board 24.

The light emitting element 22 has a configuration in which three white light emitting diodes are arranged adjacent to each other in the vehicle width direction (that is, a left-right direction), and thus has a laterally long rectangular light emitting surface. The light emitting element 22 is arranged in a state where the light emitting surface thereof faces a lamp front direction (that is, a vehicle front side).

The light source unit 20 is a rotationally-mounted light source unit, and is mounted on the housing 12 by inserting the socket 26 thereof from the lamp rear side into the opening 12c1 of the housing 12 and rotating the socket 26 clockwise by a predetermined angle (specifically, 45°).

The socket 26 of the light source unit 20 includes a socket body 26A that is made of resin, and a heat sink 26B fixed to the socket body 26A. The heat sink 26B is made of metal (for example, made by aluminum die casting).

The socket body 26A is formed in a cylindrical shape with an outer diameter slightly smaller than an inner diameter of the opening 12c1 of the housing 12. A plurality of engagement protruding portions 26Aa configured to engage with the rear wall portion 12c of the housing 12 are formed around the opening 12c1 on an outer peripheral surface of a front end portion of the socket body 26A. As shown in FIG. 9A, a connector portion 26Ab configured to supply power to the light source unit 20 is formed at a rear end portion of the socket body 26A.

A front end portion 26B1 of the heat sink 26B is formed in a disk shape. The front end portion 26B1 of the heat sink 26B is fixed to the socket body 26A. The heat sink 26B includes five heat dissipating fins 26B2 that extend on an outer peripheral surface of the front end portion 26B1 in a band shape toward the lamp rear side. The five heat dissipating fins 26B2 are formed at an apex position of the light source unit 20 and at positions at equal intervals (specifically, intervals of 45°) on left and right sides from the apex position.

The light source unit 20 has a configuration in which an elastic seal member 28 is mounted to a front end portion of the socket 26. The elastic seal member 28 is formed of an elastic annular member such as an O-ring fitted to an outer peripheral surface of the socket body 26A. The elastic seal member 28 is mounted in a state of being in contact with the front end portion 26B1 of the heat sink 26B. When the light source unit 20 is mounted to the housing 12, the elastic seal member 28 is pressed against the rear wall portion 12c of the housing 12 and is elastically compressed and deformed. As a result, airtightness in the lamp chamber is ensured.

As shown in FIG. 8, the opening 12c1 of the housing 12 has an opening shape with concave and convex portions corresponding to the plurality of engagement protruding portions 26Aa formed on the socket body 26A. A shape of the concave and convex portions of the opening 12c1 is formed in a positional relationship obtained by rotating the plurality of engagement protruding portions 26Aa of the light source unit 20 (indicated by a two-dot chain line in the drawing) in a mounted state by 45° clockwise in the lamp front view.

A stopper 12c2 is formed at one location around the opening 12c1 on a front surface of the rear wall portion 12c of the housing 12 so as to abut against the engagement protruding portion 26Aa of the socket body 26A when the socket body 26A inserted into the opening 12c1 is rotated by 45° clockwise to restrict further rotation.

As shown in FIG. 9A, a rib 12c3 that extends toward the lamp rear side is formed on a rear surface of the rear wall portion 12c of the housing 12 so as to surround the opening 12c1.

The rib 12c3 surrounds an entire circumference of the opening 12c1. A cutout portion 12c3a is formed in a lower end portion of the rib 12c3.

The rib 12c3 extends along a cylindrical surface centered on a central axis of the light source unit 20. The rib 12c3 extends to the lamp rear side relative to a position where the elastic seal member 28 is pressed against the rear wall portion 12c of the housing 12. Specifically, as shown in FIG. 1, a rear end surface of the rib 12c3 is located further on the lamp rear side relative to an abutting position between the elastic seal member 28 and the front end portion 26B1 of the heat sink 26B. The central axis of the light source unit 20 is located above the optical axis Ax in the vicinity thereof. When the light source unit 20 is mounted on the housing 12, the light emitting element 22 is arranged in a state where a lower end edge of the light emitting surface extends in the horizontal direction above the optical axis Ax in the vicinity thereof (see FIGS. 3 and 8).

As shown in FIG. 9A, a mark 12c3b that indicates a predetermined mounting position of the rotationally-mounted light source unit 20 is formed on an outer peripheral surface of the rib 12c3. The mark 12c3b is formed at a position directly above the central axis of the light source unit 20, and is intended to indicate that the light source unit 20 is mounted in an upright state.

On the outer peripheral surface of the rib 12c3, another mark 12c3c is formed at a position obtained by rotating by 45° counterclockwise from the mark 12c3b in a lamp rear view. The mark 12c3c indicates an angular position when the light source unit 20 is inserted into the opening 12c1.

The mark 12c3b is formed as a triangular protruding portion in the lamp rear view. Meanwhile, the mark 12c3c is formed as a semicircular arc protruding portion in the lamp rear view.

Next, an operational effect of the present embodiment will be described.

In the vehicle lamp 10 according to the present embodiment, the lens holder 34 that supports the projection lens 32 is supported in the manner that allows the up-down direction rotation with respect to the housing 12. As a result, optical axis adjustment can be performed in the up-down direction in a state where the light emitting element 22 is fixed to the housing 12. Therefore, the vehicle lamp 10 can have a compact configuration, and the vehicle lamp 10 which is particularly suitable for a fog lamp or the like can be provided.

Since the light emitting element 22 which serves as the light source is configured as a part of the light source unit 20 including the socket 26 that supports the board 24 where the light emitting element 22 is mounted, a lamp configuration can be simplified.

The light source unit 20 has the configuration in which the elastic seal member 28 is mounted to the front end portion of the socket 26. The light source unit 20 is mounted on the housing 12 in the state where the socket 26 is inserted into the opening 12c1 formed in the rear wall portion 12c of the housing 12 and the elastic seal member 28 is pressed against the rear wall portion 12c. As a result, a certain degree of water-tightness can be ensured.

The rib 12c3 which extends toward the lamp rear side is formed on the rear wall portion 12c of the housing 12 so as to surround at least an upper half portion of the opening 12c1. Therefore, rainwater is less likely to flow down to a mounting portion where the light source unit 20 is mounted to the housing 12, and high-pressure washing water during car washing is less likely to be applied to the mounting portion. As a result, the water can be effectively prevented from entering the lamp chamber.

In this way, according to the present embodiment, water can be prevented from entering the lamp chamber even when the light source unit 20 is used in the lens-movable vehicle lamp 10 which is configured to control light distribution of light from the light emitting element 22 by the projection lens 32.

In particular, in the present embodiment, the rib 12c3 surrounds the entire circumference of the opening 12c1 of the housing 12, and the cutout portion 12c3a is formed in the lower end portion of the rib 12c3. Therefore, water can be effectively prevented from entering the lamp chamber and the water can also be prevented from accumulating on an inner peripheral surface of the rib 12c3.

The rib 12c3 extends to the lamp rear side relative to the position where the elastic seal member 28 is pressed against the rear wall portion 12c of the housing 12. Therefore, the rainwater is less likely to flow down to the mounting portion where the light source unit 20 is mounted to the housing 12, and the high-pressure washing water during car washing is less likely to be applied to the mounting portion. As a result, the water can be effectively prevented from entering the lamp chamber.

The light source unit 20 is mounted on the housing 12 by inserting the socket 26 into the opening 12c1 formed in the rear wall portion 12c of the housing 12 and rotating the socket 26. Therefore, the light emitting element 22 can be accurately positioned relative to the lamp front-rear direction.

The mark 12c3b that indicates the predetermined mounting position of the light source unit 20 is formed on the outer peripheral surface of the rib 12c3. Therefore, the light source unit 20 can be prevented from being mounted to the housing 12 in an incomplete state. As a result, the water can be effectively prevented from entering the lamp chamber.

The mark 12c3c that indicates the angular position when the light source unit 20 is inserted into the opening 12c1 is also formed on the outer peripheral surface of the rib 12c3 in addition to the mark 12c3b. Therefore, mounting of the light source unit 20 can be easily performed.

Since the two marks 12c3b and 12c3c are all formed as protruding portions, the marks 12c3b and 12c3c can be easily recognized visually or tactilely. The mark 12c3b is formed as the triangular protruding portion in the lamp rear view, while the mark 12c3c is formed as the semicircular arc protruding portion in the lamp rear view. As a result, the two marks 12c3b and 12c3c can be easily identified.

The reflective member 36 configured to reflect the external light, which has passed through the projection lens 32 and entered the internal space of the housing 12, is arranged on the lamp rear side relative to the projection lens 32. The reflective member 36 has the configuration in which the plurality of reflecting elements 36s that reflect the external light toward the projection lens 32 are formed in the portion that overlaps the peripheral edge portion of the projection lens 32 in the lamp front view. As a result, the following operational effect can be obtained.

That is, when the vehicle lamp 10 is observed from the lamp front side in a non-lighting state, the internal space of the housing 12 is seen through the projection lens 32. At this time, the reflective member 36 is illuminated and seen at a plurality of locations due to the external light. Therefore, the internal space of the housing 12 can be prevented from being seen darkly even when the lamp is not lighted. As a result, visibility thereof as the vehicle lamp 10 can be improved.

The plurality of reflecting elements 36s are formed at the portion which overlaps the peripheral edge portion of the lens body portion 32A of the projection lens 32 in the lamp front view. As a result, light from the light emitting element 22 toward the projection lens 32 can be prevented from being blocked due to an arrangement of the reflective member 36, or such blocking can be minimized.

In this way, according to the present embodiment, the visibility when the lamp is not lighted can be improved in the lens-movable vehicle lamp 10 which is configured to control the light distribution of the light from the light emitting element 22 by the projection lens 32.

In the present embodiment, since the reflective member 36 is supported by the lens holder 34, the following operational effect can be obtained.

That is, since the reflective member 36 rotates in the up-down direction together with the lens holder 34 and the projection lens 32, the reflective member 36 can be arranged close to the projection lens 32, so that the internal space of the housing 12 can be illuminated and seen more brightly.

In the present embodiment, since the reflective member 36 is made of a transparent member, reflection of the external light reflected by the plurality of reflecting elements 36s can be performed by total reflection. Therefore, when the vehicle lamp 10 is observed from the lamp front side in the non-lighting state, the reflective member 36 can be illuminated and seen at the plurality of locations with a crystal feeling. As a result, the visibility thereof can be further improved when the lamp is not lighted.

Further, in the present embodiment, the lens holder 34 is also made of the transparent member. The external light that has passed through the lens holder 34 also enters the internal space of the housing 12. Therefore, when the vehicle lamp 10 is observed from the lamp front side in the non-lighting state, the internal space of the housing 12 can be illuminated and seen more brightly.

In the present embodiment, since the reflective member 36 is molded integrally with the lens holder 34, the number of components of the vehicle lamp 10 can be reduced while the above-described operational effect can still be obtained.

In the present embodiment, the projection lens 32 is fixed to the lens holder 34 by thermal caulking. As a result, support of the projection lens 32 provided by the lens holder 34 can be achieved by an inexpensive fixed structure.

The air hole 12b3 configured to absorb the pressure fluctuation in the lamp chamber is formed in the left side wall portion 12b (peripheral wall portion) of the housing 12. As a result, even when the optical axis adjusting screw 40 and the protruding piece 34B screwed with the screw portion 40a are arranged as a rotation mechanism configured to rotate the lens holder 34 in the up-down direction in the lamp chamber, a space for forming the air hole 12b3 can be easily secured.

In this way, according to the present embodiment, the air hole 12b3 configured to absorb the pressure fluctuation in the lamp chamber can be easily formed in the lens-movable vehicle lamp 10 which is configured to control the light distribution of the light from the light emitting element 22 by the projection lens 32.

Moreover, in the present embodiment, the light emitting element 22 is configured as a part of the light source unit 20 which is mounted on the rear wall portion 12c of the housing 12. Therefore, since it is more difficult to secure the space for forming the air hole 12b3 in the rear wall portion 12c with such a lamp configuration, it is particularly effective to adopt the configuration of the present embodiment.

In the vehicle lamp 10 according to the present embodiment, the translucent cover 14 is inclined from the left end portion thereof toward the right end portion toward the lamp rear side along a shape of a vehicle body (specifically, a shape of the bumper 100). As a result, a front-rear length of the left side wall portion 12b (that is, a side wall portion on a vehicle width direction inner side) of the housing 12 is relatively long. Therefore, by forming the air hole 12b3 in the left side wall portion 12b, the space for forming the air hole in the peripheral wall portion of the housing 12 can be easily secured.

In the present embodiment, the pair of left and right fulcrum protruding portions 34La and 34Ra are formed at the positions on the rotation axis Ax1 of the lens holder 34. The fulcrum engagement recessed portion 12a1 and the fulcrum engagement hole 12b1 are respectively formed on the inner side surfaces of the right side wall portion 12a and the left side wall portion 12b of the housing 12 as fulcrum engagement portions. As a result, the lens holder 34 can be supported to the housing 12 with a simple configuration.

The fulcrum engagement portion of the right side wall portion 12a is configured as the fulcrum engagement recessed portion 12a1. The fulcrum engagement portion of the left side wall portion 12b is configured as the fulcrum engagement hole 12b1 that penetrates the left side wall portion 12b in the vehicle width direction. Therefore, the fulcrum engagement hole 12b1 and the fulcrum engagement recessed portion 12a1 can be formed by one slide pin. As a result, a structure of a mold for molding the housing 12 can be simplified.

Further, in the present embodiment, the filter 50 that is waterproof and moisture diffusive is mounted on the left side wall portion 12b of the housing 12 so as to close the air hole 12b3 and the fulcrum engagement hole 12b1. Therefore, moisture generated in the lamp chamber can be discharged by diffusing action, and thus dew condensation can be effectively prevented from occurring on an inner surface of the translucent cover 14. Moreover, such an effect can be achieved by mounting a single filter.

Since the filter 50 is formed in the sheet shape, the vehicle lamp 10 can be maintained in a compact configuration.

The annular bead portion 12b4 that surrounds the fulcrum engagement hole 12b1 and the air hole 12b3 is formed on the outer side surface of the left side wall portion 12b. The region located on the inner peripheral side of the annular bead portion 12b4 on the left side wall portion 12b is formed as the flat portion 12b5. Further, the air hole 12b3 and the fulcrum engagement hole 12b1 are formed in the flat portion 12b5. Therefore, the annular bead portion 12b4 can function as the positioning guide when the filter 50 is attached to the left side wall portion 12b. Moreover, the filter 50 attached to the left side wall portion 12b can become difficult to be peeled off. Since the height of the annular bead portion 12b4 is set to the value larger than the thickness of the filter 50, the filter 50 can become more difficult to be peeled off.

Moreover, since the filter 50 is made of expanded polytetrafluoroethylene, waterproof performance and moisture diffusivity can be sufficiently ensured.

In the present embodiment, the annular bead portion 12*b*4 extends in the annular shape, and the filter 50 has the circular outer shape. Therefore, the filter can be effectively prevented from being inadvertently peeled off.

In the present embodiment, since the air hole 12*b*3 has the opening shape larger than the fulcrum engagement hole 12*b*1, ventilation performance can be sufficiently ensured.

The leg portions 34R and 34L which extend toward the lamp rear side are formed on each of two vehicle width direction end portions of the lens holder 34. The fulcrum protruding portions 34Ra and 34La are formed on the outer side surfaces of the rear end portions of the leg portions 34R and 34L, respectively. The fulcrum engagement recessed portion 12*a*1 and the fulcrum engagement hole 12*b*1 are respectively formed as the fulcrum engagement portions that engage with the fulcrum protruding portions 34Ra and 34La of the leg portions 34R and 34L at the positions on the rotation axis Ax1 on the right side wall portion 12*a* and the left side wall portion 12*b* of the housing 12. Therefore, a degree of freedom in a positional relationship between the rotation axis Ax1 and the projection lens 32 can be improved.

Meanwhile, the protruding piece 34B which extends toward the lamp rear side is formed at an end portion, which is located on the vehicle width direction inner side, of the lens holder 34 (that is, one end portion in the vehicle width direction). The optical axis adjusting screw 40 is screwed with the groove portion 34Ba1 formed in the inner side surface of the rear region 34Ba, which is located on the lamp rear side relative to the rotation axis Ax1, of the protruding piece 34B. For convenience of molding such a lens holder 34, it is difficult to bring a position of a base end portion of the protruding piece 34B close to the left side wall portion 12*b* of the housing 12. Therefore, a large gap is easily formed between the leg portion 34L (first leg portion), which is located on the vehicle width direction inner side (that is, the side of the protruding piece relative to the vehicle width direction), and the left side wall portion 12*b* of the housing 12 in such a lamp configuration. Therefore, when the lens holder 34 is relatively displaced in the vehicle width direction due to vehicle vibration or the like, the fulcrum protruding portion 34Ra of the leg portion 34R (second leg portion) located on the vehicle width direction outer side (that is, a side opposite to the protruding piece relative to the vehicle width direction) is easily detached from a state where the fulcrum protruding portion 34Ra is engaged with the fulcrum engagement recessed portion 12*a*1 of the housing 12.

However, in the vehicle lamp 10 according to the present embodiment, the detachment prevention protruding portions 34Bb is formed on the outer side surface of the front region, which is located on the lamp front side relative to the rotation axis Ax1, of the protruding piece 34B. Therefore, even when the lens holder 34 is relatively displaced in the vehicle width direction due to the vehicle vibration or the like, the detachment prevention protruding portion 34Bb is abutted against the left side wall portion 12*b* of the housing 12. As a result, the fulcrum protruding portion 34Ra of the leg portion 34R can be prevented from being detached from the state where the fulcrum protruding portion 34Ra is engaged with the fulcrum engagement recessed portion 12*a*1 of the housing 12. Therefore, the lens holder 34 can be prevented from being detached from the housing 12.

In this way, according to the present embodiment, the lens holder 34 that supports the projection lens 32 can be prevented from being detached from the housing 12 in the lens-movable vehicle lamp 10 which is configured to control the light distribution of the light from the light emitting element 22 by the projection lens 32.

In particular, in the present embodiment, the leg portion 34L located on the side of the protruding piece 34B is longer than the other leg portion 34R. A large gap is formed between the leg portion 34L and the left side wall portion 12*b* of the housing 12. That is, the fulcrum protruding portion 34Ra of the leg portion 34R is more likely to be detached from the state where the fulcrum protruding portion 34Ra is engaged with the fulcrum engagement recessed portion 12*a*1 of the housing 12 due to the vehicle vibration or the like. Therefore, it is effective to adopt the configuration of the present embodiment.

In the present embodiment, the leg portion 34L located on the side of the protruding piece 34B is formed in the tongue-like shape facing the lamp rear side. The protruding piece 34B surrounds the leg portion 34L on the same vertical plane as the leg portion 34L. As a result, a required width in the vehicle width direction of the vehicle lamp 10 can be minimized.

The detachment prevention protruding portion 34Bb is formed at the two locations, which are located on the upper and lower sides of the leg portion 34L, of the protruding piece 34B. Therefore, when the lens holder 34 is relatively displaced in the vehicle width direction due to the vehicle vibration or the like, the detachment prevention protruding portions 34Bb can be abutted against the left side wall portion 12*b* of the housing 12 at the two upper and lower locations. As a result, the lens holder 34 can be effectively prevented from being detached from the housing 12.

Since each detachment prevention protruding portion 34Bb is located at the front end portion of the protruding piece 34B, a relative displacement amount of the lens holder 34 in the vehicle width direction can be minimized.

Further, in the present embodiment, the gap between the tip end surface of each detachment prevention protruding portion 34Bb (that is, an end surface located on the vehicle width direction inner side) and the inner side surface of the left side wall portion 12*b* of the housing 12 is set to the value smaller than the insertion depth by which the fulcrum protruding portion 34Ra of the leg portion 34R is inserted into the fulcrum engagement recessed portion 12*a*1 of the housing 12 in the state where the fulcrum protruding portion 34Ra is engaged with the fulcrum engagement recessed portion 12*a*1. As a result, the fulcrum protruding portion 34Ra can be prevented from being detached from the state where the fulcrum protruding portion 34Ra is engaged with the fulcrum engagement recessed portion 12*a*1.

In the present embodiment, the reinforcing rib 34Lb is formed on the inner side surface of the leg portion 34L. As a result, even though the leg portion 34L is long, a risk of breakage of the leg portion 34L when the lens holder 34 is relatively displaced in the vehicle width direction due to the vehicle vibration or the like can be reduced.

The groove portion 12*a*2 that extends from the fulcrum engagement recessed portion 12*a*1 toward the lamp front side is formed in the inner side surface of the right side wall portion 12*a* of the housing 12. As a result, the fulcrum protruding portion 34Ra is engaged with the groove portion 12*a*2 when the right leg portion 34R is inserted inside the housing 12, so that the fulcrum protruding portion 34Ra can be moved toward the lamp rear side in a state of being guided in the up-down direction and be inserted into the fulcrum engagement recessed portion 12a1. Therefore, the fulcrum protruding portion 34Ra and the fulcrum engagement recessed portion 12a1 can be easily engaged.

The groove portion 12b2 that extends from the fulcrum engagement hole 12b1 toward the lamp front side is formed in the inner side surface of the left side wall portion 12b of the housing 12. As a result, the fulcrum protruding portion 34La is engaged with the groove portion 12b2 when the left leg portion 34L is inserted inside the housing 12, so that the fulcrum protruding portion 34La can be moved toward the lamp rear side in a state of being guided in the up-down direction and be inserted into the fulcrum engagement hole 12b1. Therefore, the fulcrum protruding portion 34La and the fulcrum engagement hole 12b1 can be easily engaged.

Therefore, according to the present embodiment, lamp assembling efficiency can be improved in the lens-movable vehicle lamp 10 which is configured to control the light distribution of the light from the light emitting element 22 by the projection lens 32.

The up-down widths of the front regions of the groove portions 12a2 and 12b2 are set to the values larger than the up-down widths of the rear regions thereof. Therefore, the fulcrum protruding portions 34Ra and 34La can be easily engaged with the front regions whose up-down widths are large, the fulcrum protruding portions 34Ra and 34La can be moved toward the rear regions whose up-down widths are narrow. As a result, guidance toward each of the fulcrum engagement recessed portion 12a1 and the fulcrum engagement hole 12b1 can be easily performed. Therefore, the lamp assembling efficiency can be further improved.

Each of the groove portions 12a2 and 12b2 is formed such that the up-down width gradually increases toward the lamp front side. Therefore, the fulcrum protruding portions 34Ra and 34La engaged with the groove portions 12a2 and 12b2 can be smoothly moved toward the lamp rear side. As a result, the lamp assembling efficiency can be further improved.

The depth of the front region of each of the groove portions 12a2 and 12b2 is set to the value larger than the depth of the rear region. Therefore, each of the fulcrum protruding portions 34Ra and 34La can be easily engaged with the front regions which are relatively deep, and the fulcrum protruding portions 34Ra and 34La can be moved toward the rear regions which are relatively shallow. As a result, the guidance toward each of the fulcrum engagement recessed portion 12a1 and the fulcrum engagement hole 12b1 can be easily performed. Therefore, the lamp assembling efficiency can be further improved.

Each of the groove portions 12a2 and 12b2 gradually deepens toward the lamp front side. Therefore, the fulcrum protruding portions 34Ra and 34La engaged with the groove portions 12a2 and 12b2 can be smoothly moved toward the lamp rear side along the groove portions 12a2 and 12b2. As a result, the lamp assembling efficiency can be further improved.

Although each of the marks 12c3b and 12c3c is formed in a convex shape in the first embodiment, it is also possible to adopt a mark formed in a concave shape, a printed mark, or an engraved mark.

Although the air hole 12b3 is formed in the left side wall portion 12b as a hole independent of the fulcrum engagement hole 12b1 in the first embodiment, the present invention is not limited thereto. By forming a slit or the like extending from the fulcrum engagement hole 12b1 in the left side wall portion 12b, the air hole may also be formed as a hole communicating with the fulcrum engagement hole 12b1.

Although the air hole 12b3 is formed in the left side wall portion 12b of the housing 12 in the first embodiment, the present invention is not limited thereto. It is also possible to adopt a configuration in which the air hole is formed in the right side wall portion 12a or a lower wall portion of the housing 12.

Although the protruding piece 34B is formed on the same vertical plane as the leg portion 34L in the first embodiment, the present invention is not limited thereto. If the protruding piece 34B is formed at a position overlapping the leg portion 34L in the vehicle width direction instead of being formed on the same vertical plane, the required width of the vehicle lamp 10 in the vehicle width direction can be reduced.

Although it is assumed in the first embodiment that each detachment prevention protruding portion 34Bb is formed in the trapezoidal shape, the detachment prevention protruding portion 34Bb may also be formed in other shapes (for example, a hemispherical shape or a semi-cylindrical shape).

Although the groove portions 12a2 and 12b2 in the first embodiment are configured such that the up-down widths thereof and the depths thereof gradually increase toward the lamp front side, the present invention is not limited thereto. It is also possible to adopt a configuration in which at least one of the up-down width and the depth of each of the groove portions 12a2 and 12b2 gradually increases toward the lamp front side.

Although the groove portions 12a2 and 12b2 are respectively formed in the right side wall portion 12a and the left side wall portion 12b in the first embodiment, the present invention is not limited thereto. Even in a case where only one of the groove portions 12a2 or 12b2 is formed, the lamp assembling efficiency can be improved as compared with a case where the groove portions 12a2 and 12b2 are not formed.

Although the projection lens 32 is formed in a plano-convex lens shape in the first embodiment, the present invention is not limited thereto. The projection lens 32 may also be a lens formed in a biconvex lens shape or a convex meniscus lens shape, or a lens formed in a Fresnel lens shape.

Although the opening 36a is formed in the rear end portion of the reflective member 36 in the first embodiment, the present invention is not limited thereto. It is also possible to adopt a configuration in which a portion located in the opening 36a is formed in a translucent lens shape.

Although the integrally molded reflective member 36 and the lens holder 34 are formed of the colorless and transparent member in the first embodiment, the reflective member 36 and the lens holder 34 may also be formed of colored transparent members.

Although the housing 12 that supports the light distribution control unit 30 is the lamp body in the first embodiment, the present invention is not limited thereto. The housing 12 may also function as another lamp component (for example, a member supported by the lamp body).

Although the vehicle lamp 10 is a fog lamp in the first embodiment, the vehicle lamp 10 may also be configured as a lamp other than the fog lamp (for example, a head lamp).

Next, a modification of the first embodiment will be described.

First, a first modification of the first embodiment will be described.

Figure 9B:
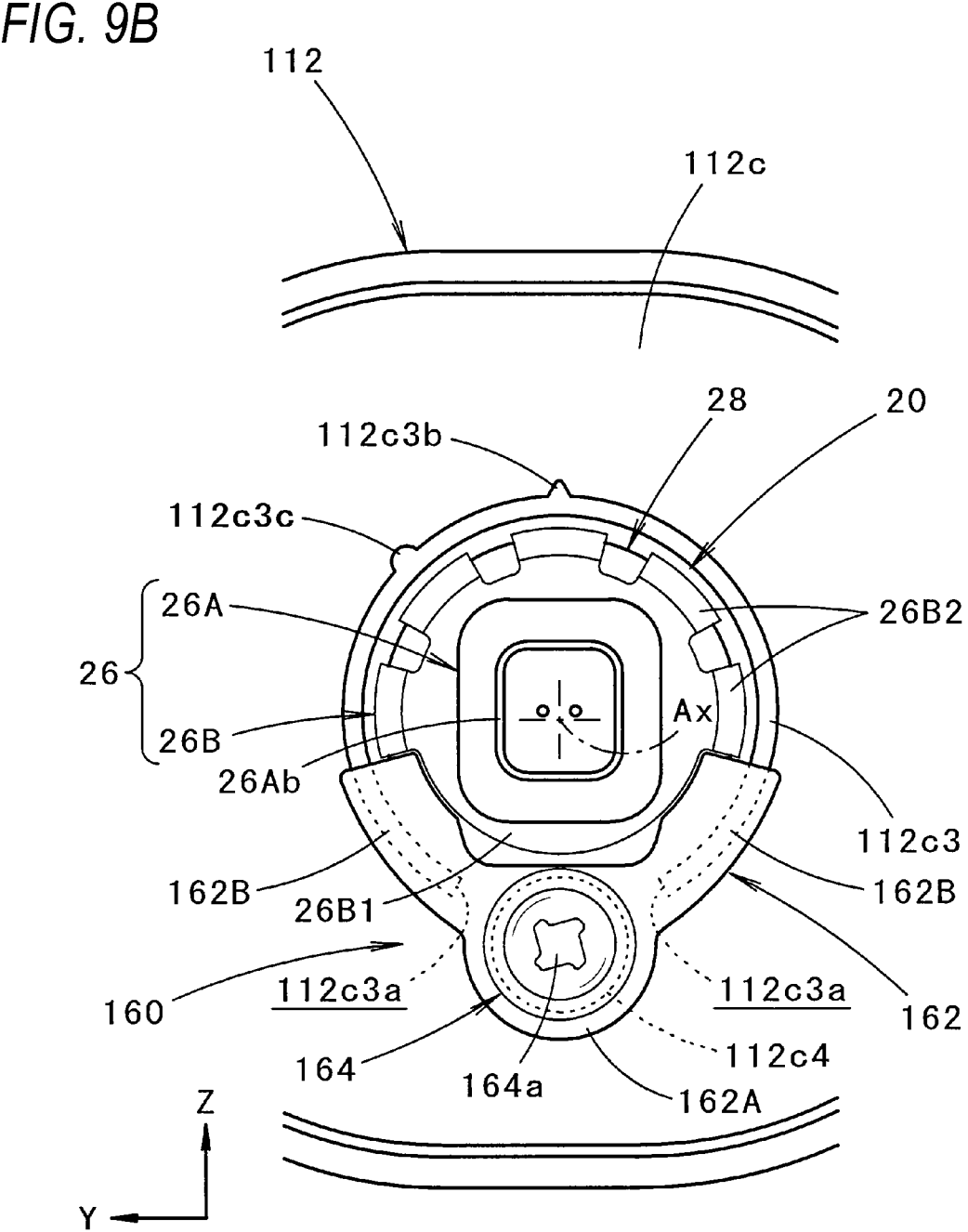
FIG. 9B shows a first modification of the first embodiment, and is similar to FIG. 9A.

FIG. 9B partially shows a vehicle lamp according to the present modification, and is similar to FIG. 9A.

As shown in FIG. 9B, a basic configuration of the present modification is the same as the configuration of the first embodiment. However, a mounting structure configured to mount the light source unit 20 to a housing 112 is partially different from that of the first embodiment.

That is, in the present modification, the light source unit 20 is also mounted on the housing 112 by inserting the socket 26 of the light source unit 20 from the lamp rear side into an opening (not shown) of the housing 112 and rotating the socket 26 clockwise by a predetermined angle. The present modification is different from the first embodiment in that a reverse rotation prevention structure 160 is provided in the housing 112.

The reverse rotation prevention structure 160 is a structure configured to abut against the socket 26 so as to prevent the light source unit 20 from rotating in a loosening direction from a predetermined mounting position.

Specifically, the reverse rotation prevention structure 160 includes an abutting member 162 configured to abut against the socket 26, and a screw 164. The screw 164 is a fastening member configured to fasten the abutting member 162 to a rear wall portion 112c of the housing 112.

The screw 164 fixes the abutting member 162 to the rear wall portion 112c of the housing 112 at a position directly below the light source unit 20.

In order to achieve such a configuration, a boss portion 112c4 configured to fix the screw 164 to a position directly below the optical axis Ax is formed on the rear wall portion 112c of the housing 112.

In the housing 112 of the present modification, a rib 112c3 that extends along a cylindrical surface centered on the central axis of the light source unit 20 is formed on a rear surface of the rear wall portion 112c. A lower end portion of the rib 112c3 extends to the vicinity of the boss portion 112c4. As a result, cutout portions 112c3a are formed on left and right sides of the boss portion 112c4.

A height (that is, a rearward protrusion amount) of the rib 112c3 is set to the same value as that of the rib 12c3 of the first embodiment. On an outer peripheral surface of the rib 112c3, the same marks 112c3b and 112c3c are formed at the same positions as those of the rib 12c3 of the first embodiment.

The abutting member 162 is a plate-shaped member made of resin, and includes a fastening portion 162A and arm portions 162B. The fastening portion 162A is fixed to the boss portion 112c4 of the housing 112 by the screw 164. The arm portions 162B extend along the rib 112c3 from the fastening portion 162A toward left and right directions.

In a state where the abutting member 162 is fixed to the boss portion 112c4 of the housing 112 by the screw 164, tip end surfaces of the pair of left and right arm portions 162B abut (or come close to) the heat sink 26B of the light source unit 20. The abutment of the abutting member 162 against the heat sink 26B is performed with respect to a pair of left and right heat dissipating fins 26B2 positioned at a lowermost end among the five heat dissipating fins 26B2. The abutting member 162 is abutted against the heat dissipating fins 26B2 of the heat sink 26B so as to prevent the light source unit 20 from rotating in the loosening direction from the predetermined mounting position.

In the state where the abutting member 162 is fixed to the boss portion 112c4 of the housing 112, an inner peripheral edge of each arm portion 162B extends along the outer peripheral surface of the front end portion 26B1 of the heat sink 26B.

The screw 164 is configured as a washer faced screw, and has a screw hole shape that only allows transmission of a rotational force in a direction in which the screw 164 is tightened. That is, a screw hole 164a of the screw 164 has a shape in which a wall surface located in a counterclockwise direction with respect to a plus (+) shaped groove portion is missing.

In a case where the configuration of the present modification is adopted, the same operational effect as in the case of the first embodiment can still be obtained.

By providing the reverse rotation prevention structure 160 as in the present modification, the light source unit 20 is always held at the predetermined mounting position.

That is, the reverse rotation prevention structure 160 is abutted against the socket 26 so as to prevent the light source unit 20 from rotating in the loosening direction from the predetermined mounting position. Therefore, a shape of a light distribution pattern formed by the light from the light emitting element 22 emitted from the projection lens 32 can be prevented from becoming different from a desired shape.

The light emitting element 22 of the light source unit 20 has the configuration in which the plurality of white light emitting diodes are arranged adjacent to each other. When the light source unit 20 is rotated to the predetermined mounting position, the light emitting surface of the light emitting element 22 extends laterally, and the lower end edge of the light emitting surface extends in the horizontal direction above the optical axis Ax in the vicinity thereof. As a result, a laterally long light distribution pattern whose upper end edge includes a horizontal cutoff line can be formed, and thus the vehicle lamp can be particularly suitable for a fog lamp or the like.

In the present modification, the reverse rotation prevention structure 160 includes the abutting member 162 configured to abut against the socket 26 of the light source unit 20, and the screw 164 which serves as the fastening member configured to fasten the abutting member 162 to the rear wall portion 112c of the housing 112. Therefore, the light source unit 20 can be prevented, by a simple configuration, from rotating in the loosening direction from the predetermined mounting position.

The socket 26 of the light source unit 20 includes the socket body 26A, and the heat sink 26B fixed to the socket body 26A. Since the abutment of the abutting member 162 against the light source unit 20 is performed with respect to the heat sink 26B, the following operational effect can be obtained.

That is, the heat sink 26B is made of a hard metal member, and hardly deforms even when the abutting member 162 is abutted against the heat sink 26B. As a result, the light source unit 20 can be reliably prevented from rotating in the loosening direction from the mounting position.

Further, in the present modification, since the fastening member is constituted by the screw 164, the abutting member 162 can be fastened with a simple configuration.

The screw 164 includes the screw hole 164a that only allows the transmission of the rotational force in the direction in which the screw 164 is tightened. As a result, the screw 164 can be prevented from being detached due to an inadvertent driver operation after the vehicle lamp 10 is assembled, while the light source unit 20 can be prevented from rotating from the mounting position in the loosening direction.

In the present modification, the abutting member 162 includes the fastening portion 162A fixed to the rear wall portion 112c of the housing 112 and the pair of arm portions 162B extending from the fastening portion 162A. The tip end surfaces of the pair of arm portions 162B are abutted against or close to the heat sink 26B in the state where the fastening portion 162A is fastened to the rear wall portion 112c of the housing 112. As a result, positioning of the abutting member 162 can be easily performed.

The heat sink 26B includes the front end portion 26B1 which has the disk shape, and the five heat dissipating fins 26B2 that extend on the outer peripheral surface of the front end portion 26B1 in the band shape toward the lamp rear side. The front end portion 26B1 of the heat sink 26B is fixed to the socket body 26A. The being abutted against or close to of the tip end surfaces of the pair of arm portions 162B with respect to the heat sink 26B is performed with respect to the pair of heat dissipating fins 26B2 which are located at a peripheral direction end portion among the five heat dissipating fins 26B2. Therefore, the positioning of the abutting member 162 can be performed more easily.

Further, the pair of arm portions 162B of the abutting member 162 extend along the outer peripheral surface of the front end portion 26B1 of the heat sink 26B in the state where the fastening portion 162A is fastened to the rear wall portion 112c of the housing 112. As a result, the pair of arm portions 162B can be used as a guide when the abutting member 162 is fixed to the rear wall portion 112c of the housing 112.

Since the abutting member 162 is formed of the plate-shaped member which is made of resin, the reverse rotation prevention structure 160 can have a simple and lightweight configuration.

Although the fastening member is constituted by the screw 164 in the first modification, the fastening member may also be constituted by a clip or the like.

Next, a second modification of the first embodiment will be described.

FIG. 10 shows a vehicle lamp 210 according to the present modification, and is similar to FIG. 1.

As shown in FIG. 10, a basic configuration of the present modification is the same as the configuration of the first embodiment. However, a configuration of a light distribution control unit 230 is partially different from the configuration of the light distribution control unit 30 of the first embodiment.

The light distribution control unit 230 of the present modification also includes a projection lens 232, a lens holder 234, and a reflective member 236. The present modification is different from the first embodiment in that the reflective member 236 is formed separately from the lens holder 234.

Specifically, in the light distribution control unit 230 of the present modification, thermal caulking is performed in a state where the reflective member 236 is interposed between the projection lens 232 and the lens holder 234.

In order to achieve such a configuration, an outer peripheral flange portion 236b is formed at a front end portion of the reflective member 236. An annular lens pressing portion 234Ab is formed on an inner peripheral edge portion of a body portion 234A of the lens holder 234. The lens pressing portion 234Ab engages with the outer peripheral flange portion 236b of the reflective member 236 to position the reflective member 236 in a state of being abutted against a rear surface of the projection lens 232. The reflective member 236 is interposed between the projection lens 232 and the lens holder 234, and the thermal caulking is performed in a state where a caulking protruding portion 232a is inserted into an insertion hole (not shown). In the present modification, the caulking protruding portion 232a is formed at four locations on an outer peripheral edge portion of the rear surface of the projection lens 232, and the insertion hole is formed at four locations of the body portion 234A of the lens holder 234.

The caulking protruding portion 232a of the projection lens 232 is longer than the caulking protruding portion 32a of the projection lens 32 of the first embodiment. Other configurations of the projection lens 232 are the same as those of the projection lens 32 of the first embodiment.

The lens holder 234 differs from the lens holder 34 of the first embodiment in a configuration of the body portion 34A. Configurations of a pair of left and right leg portions 234L and 234R and a protruding piece 234B of the lens holder 234 are the same as those of the first embodiment.

Configurations of portions other than the outer peripheral flange portion 236b of the reflective member 236 are also the same as those of the first embodiment.

In a case where the configuration of the present modification is adopted, the same operational effect as that of the first embodiment can still be obtained.

By adopting the configuration of the present modification, although the reflective member 36 and the lens holder 34 are formed separately, support of the reflective member 36 can be achieved by an inexpensive fixed structure.

Further, by forming the reflective member 36 separately from the lens holder 34 as in the present modification, a degree of freedom in a shape of the reflective member 36 can be improved.

Next, a second embodiment of the present disclosure will be described.

Figure 11:
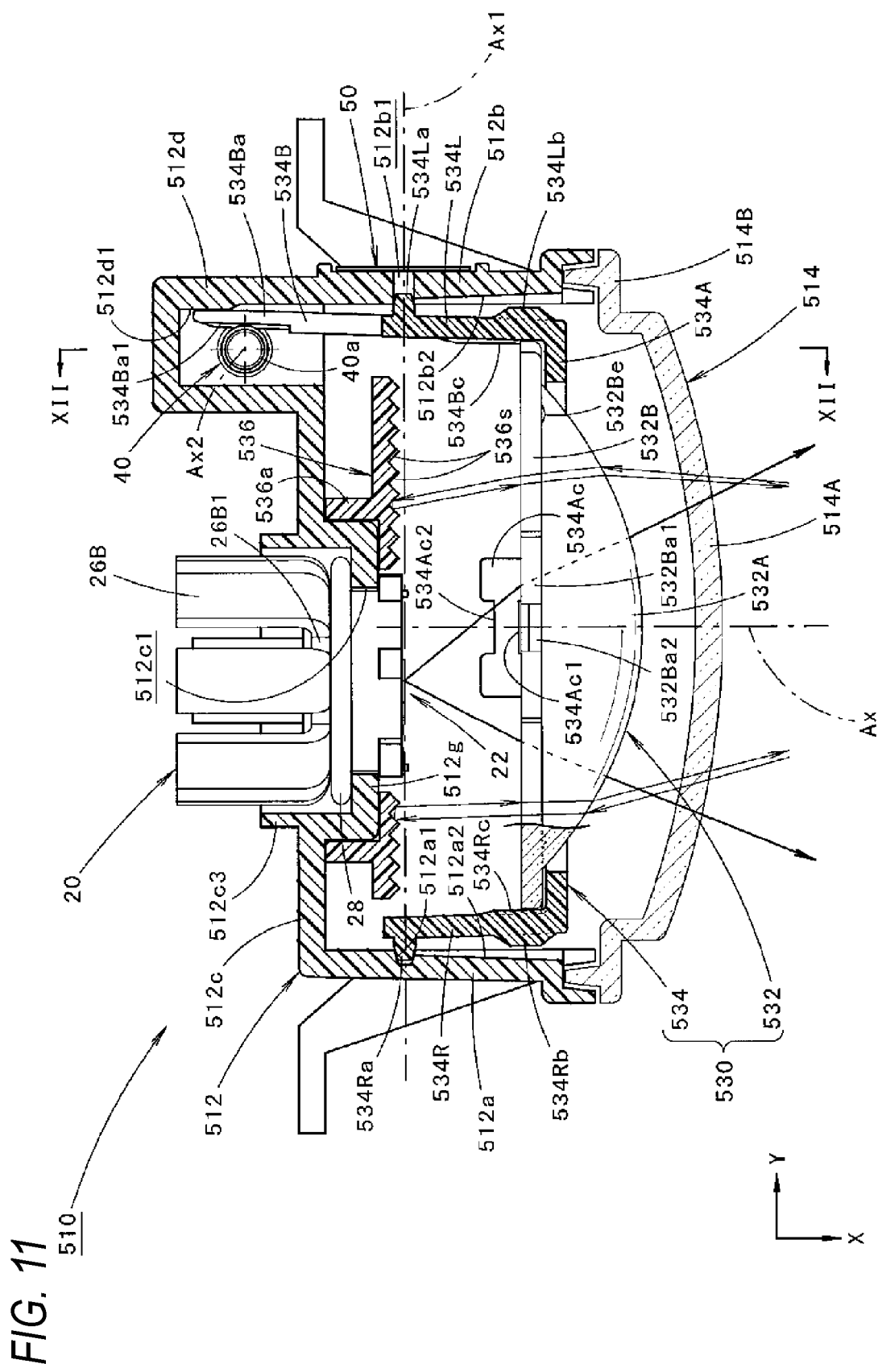
FIG. 11 is a plan sectional view showing a vehicle lamp according to a second embodiment of the present disclosure.
Figure 12:
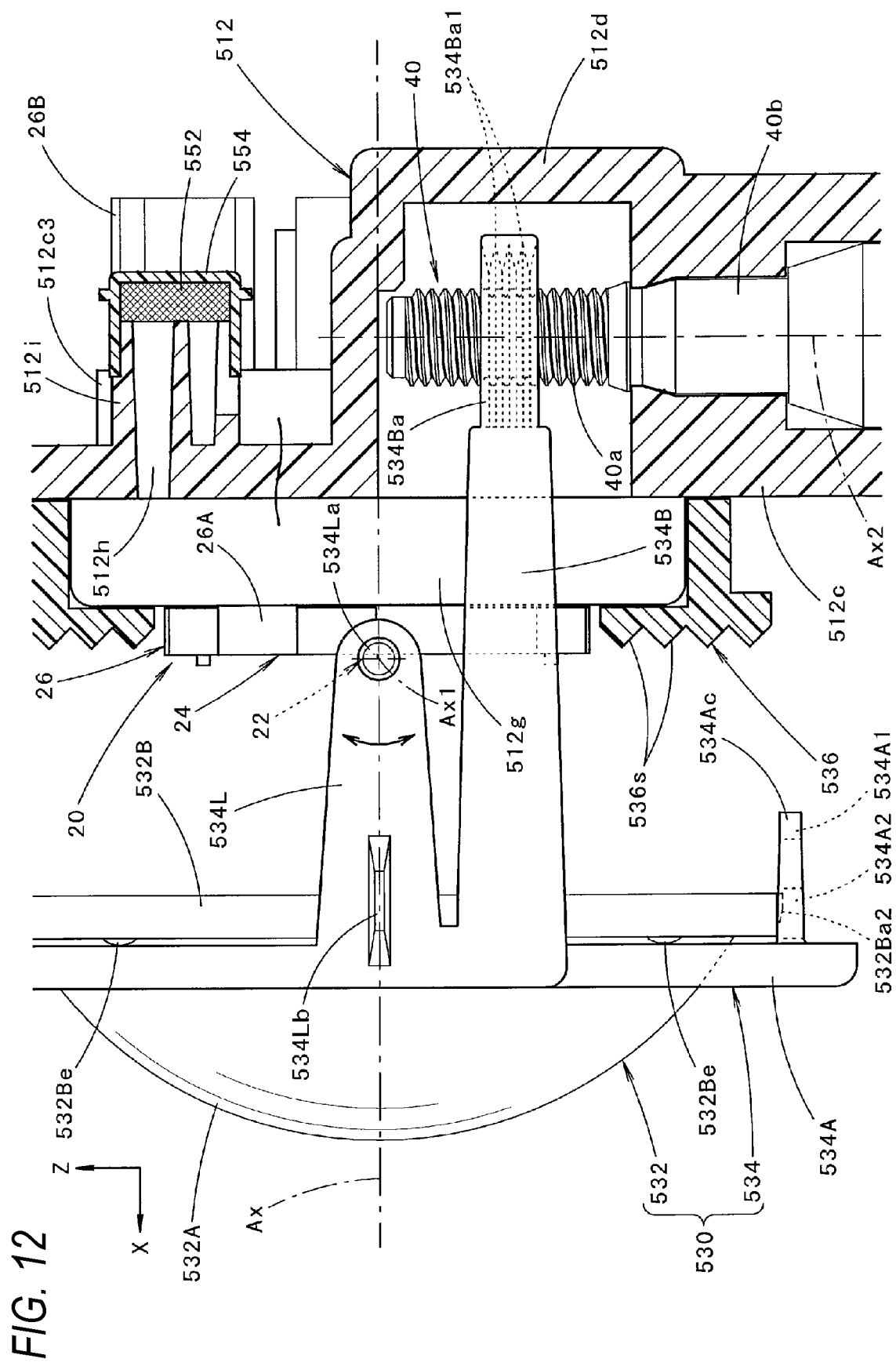
FIG. 12 is a partial sectional detailed view taken along line XII-XII of FIG. 11.

FIG. 11 is a plan sectional view showing a vehicle lamp 510 according to the present embodiment. FIG. 12 is a partial sectional detailed view taken along line XII-XII of FIG. 11.

As shown in these drawings, a basic configuration of the vehicle lamp 510 according to the present embodiment is the same as that of the first embodiment. The vehicle lamp 510 is configured as a fog lamp provided at a left front end portion of the vehicle.

In the vehicle lamp 510, shapes of a housing 512 and a translucent cover 514 are partially different from the configuration of the first embodiment. Configurations of a light distribution control unit 530 and a reflective member 536 are also different from the configuration of the first embodiment.

That is, the translucent cover 514 of the present embodiment also includes a cover body portion 514A that has a laterally elongated circular outer shape in the lamp front view, and an outer peripheral flange portion 514B which is located on an outer peripheral side of the cover body portion 514A. The translucent cover 514 faces a vehicle front direction, and is supported by the housing 512 in a vertical plane orthogonal to the vehicle front-rear direction.

The light distribution control unit 530 of the present embodiment also includes a projection lens 532 that deflects and controls the direct light from the light emitting element 22, and a lens holder 534 that supports the projection lens 532. Such support is performed by fitting the projection lens 532 into the lens holder 534 (which will be described later below).

The projection lens 532 includes a lens body portion 532A and an outer peripheral flange portion 532B. A front surface of the lens body portion 532A is formed in a convex shape while a rear surface thereof is formed in a flat shape. The outer peripheral flange portion 532B is formed in an annular shape on an outer peripheral side of the lens body portion 532A so as to be flush with the rear surface of the lens body portion 532A. The projection lens 532 has a laterally long oval outer shape in the lamp front view.

Concave and convex portions configured to be fitted to the lens holder 534 are formed on an outer peripheral surface of the outer peripheral flange portion 532B (which will also be described later below).

The lens holder 534 has a configuration in which a pair of leg portions 534L and 534R that extend toward the lamp rear side are formed on two left and right side portions of a body portion 534A which is formed in an annular shape. The pair of left and right leg portions 534L and 534R have the same length. Fulcrum protruding portions 534La and 534Ra are formed on outer side surfaces of rear end portions of the leg portions 534L and 534R, respectively.

The fulcrum protruding portion 534Ra of the right leg portion 534R is inserted into a fulcrum engagement recessed portion 512a1 formed in a right side wall portion 512a of the housing 512. The fulcrum protruding portion 534La of the left leg portion 534L is inserted into a fulcrum engagement hole 512b1 formed in a left side wall portion 512b of the housing 512. As a result, the lens holder 534 is supported in a manner that allows rotation around the rotation axis Ax1 with respect to the housing 512.

An air hole (not shown) which is the same as the air hole 12b3 of the first embodiment is formed in the left side wall portion 512b of the housing 512. The filter 50 configured to close the air hole and the fulcrum engagement hole 512b1 is mounted on the left side wall portion 512b from the side of an outer side surface thereof.

Detachment prevention protruding portions 534Lb and 534Rb are formed on outer side surfaces of front end portions of the leg portions 534L and 534R, respectively.

Each of the detachment prevention protruding portion 534Lb and 534Rb has a trapezoidal outer shape that is elongated in the lamp front-rear direction in a plan view. A tip end surface of each of the detachment prevention protruding portions 534Lb and 534Rb is formed at a height close to inner side surfaces of the left side wall portion 512b and the right side wall portion 512a of the housing 512. Gaps between the tip end surfaces of the detachment prevention protruding portions 534Lb and 534Rb and the inner side surfaces of the left side wall portion 512b and the right side wall portion 512a are set to values smaller than insertion depths by which the fulcrum protruding portions 534La and 534Ra are respectively inserted into the fulcrum engagement hole 512b1 and the fulcrum engagement recessed portion 512a1 in a state where the fulcrum protruding portions 534La and 534Ra are respectively engaged with the fulcrum engagement hole 512b1 and the fulcrum engagement recessed portion 512a1.

The lens holder 534 is formed with a protruding piece 534B that extends toward the lamp rear side on a left side portion of the lens holder 534. The protruding piece 534B extends in a plate shape along a vertical plane parallel to the optical axis Ax below the left leg portion 534L. A groove portion 534Ba1 formed in an inner side surface of a rear end portion of a rear region 534Ra of the protruding piece 534B is screwed with the optical axis adjusting screw 40 which is arranged on an overhanging portion 512d of the housing 512.

In the present embodiment, the rotationally-mounted light source unit 20 is also mounted on a rear wall portion 512c of the housing 512. An opening 512c1 configured to achieve such mounting is formed in a position obtained by displacing rightward (that is, toward the vehicle width direction inner side) from a center position of the rear wall portion 512c. As a result, a maximum diffusion angle of light emitted from the projection lens 532 toward the vehicle width direction outer side is larger than a maximum diffusion angle toward the vehicle width direction inner side.

On the rear wall portion 512c of the housing 512, a peripheral portion of the opening 512c1 is formed as a cylindrical step-up portion 512g that is displaced toward the lamp front side as compared with other portions.

The step-up portion 512g has an inner peripheral surface shape that is larger than an outer peripheral shape of the light source unit 20. A forward displacement amount of the step-up portion 512g is set such that the light emitting surface of the light emitting element 22 of the light source unit 20 is at the same position as the rotation axis Ax1 relative to the lamp front-rear direction.

In the present embodiment, a rib 512c3 that extends toward the lamp rear side is also formed on a rear surface of the rear wall portion 512c of the housing 512 so as to surround the opening 512c1. An inner peripheral surface of the rib 512c3 extends to be flush with an inner peripheral surface of the step-up portion 512g on other portions of the rear wall portion 512c.

A rearward protrusion amount of the rib 512c3 from the other portions of the rear wall portion 512c is set to the same value as that of the rib 12c3 of the first embodiment. Therefore, a position of a rear end surface of the rib 512c3 is displaced considerably from an abutting position between the elastic seal member 28 and the front end portion 26B1 of the heat sink 26B toward the lamp rear side.

In the present embodiment, the reflective member 536 configured to reflect the external light, which has passed through the translucent cover 514 and the projection lens 532 from the lamp front side and entered an internal space of the housing 512, is also arranged on the lamp rear side relative to the projection lens 532.

The reflective member 536 is an opaque resin member which is formed separately from the lens holder 534 and supported by the housing 512.

The reflective member 536 is formed in a flat plate shape that surrounds the light source unit 20. A front surface of the reflective member 536 is subjected to reflective surface treatment such as Al vaporization, and a plurality of reflecting elements 536s are formed thereon. Each reflecting element 536s is formed as a recessed portion that has a triangular pyramid shape, and retroreflects light that has reached the reflecting element 536s.

A cylindrical portion 536a that extends from a rear surface of the reflective member 536 to the lamp rear side is fitted to an outer peripheral surface of the step-up portion 512g. The reflective member 536 is configured such that the plurality of reflecting elements 536s are located on the lamp rear side relative to the light emitting surface of the light emitting element 22 of the light source unit 20. As a result, light emitted from the light emitting element 22 is prevented from being incident on each reflecting element 536s.

Figure 13:
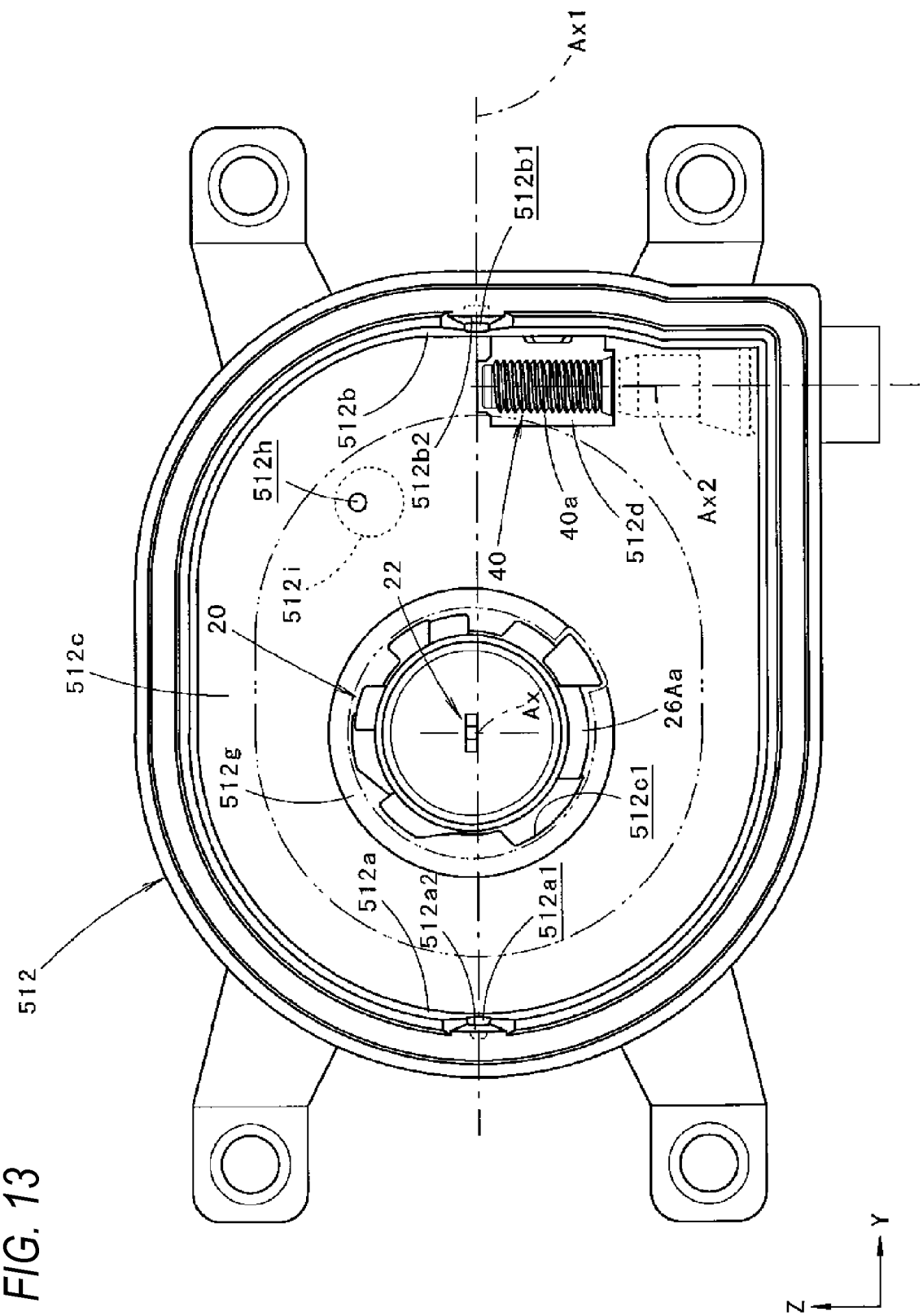
FIG. 13 is a front view showing a housing of the second embodiment where a light source unit is mounted.

FIG. 13 is a front view showing the housing 512 where the light source unit 20 is mounted.

As also shown in FIG. 13, in the present embodiment, a groove portion 512a2 that extends from the fulcrum engagement recessed portion 512a1 toward the lamp front side is formed in the inner side surface of the right side wall portion 512a of the housing 512. A groove portion 512b2 that extends from the fulcrum engagement hole 512b1 toward the lamp front side is formed in the inner side surface of the left side wall portion 512b of the housing 512.

Each of the groove portions 512a2 and 512b2 is formed such that an up-down width and a depth thereof gradually increase toward the lamp front side.

An air hole 512h that penetrates the rear wall portion 512c is formed in the rear wall portion 512c of the housing 512.

The air hole 512h is located, relative to the vehicle width direction, between the step-up portion 512g and the overhanging portion 512d where the optical axis adjusting screw 40 is arranged. The air hole 512h is also located above the rotation axis Ax1 relative to the up-down direction.

As shown in FIG. 12, the air hole 512h is formed in a boss portion 512i that protrudes from the rear wall portion 512c toward the lamp rear side.

The air hole 512h includes a through portion, a deep hole portion, and a cutout portion. The through portion is formed in an upper half portion of the boss portion 512i and extends in the lamp front-rear direction. The deep hole portion is opened toward the lamp rear side in a lower half portion of the boss portion 512i. The cutout portion is formed in a lower end portion of the boss portion 512i such that a portion of the deep hole portion is cut out.

A filter 552, which is formed in a short cylindrical shape whose outer diameter is slightly smaller than an outer diameter of the boss portion 512i, is mounted to a rear end surface of the boss portion 512i.

The filter 552 is accommodated in a manner of being fitted in an internal space of a cap 554 that is made of resin. The cap 554 is mounted to a rear end portion of the boss portion 512i so as to be abutted against the rear end surface of the boss portion 512i. The air hole 512h is blocked by the filter 552 in the middle of an air path thereof.

The filter 552 is configured as a sponge-like filter that is air permeable. That is, the filter 552 is configured as a porous filter in which a plurality of holes (for example, holes having a diameter of about 0.3 to 2.5 mm) are formed in a three-dimensional mesh pattern.

When the filter 552 and the filter 50 (the filter mounted to the left side wall portion 512b of the housing 512) shown in FIG. 11 are compared, the filter 50 is superior to the filter 552 in terms of waterproof performance and moisture diffusivity. The filter 552 is superior to the filter 50 in terms of air permeability.

Figure 14:
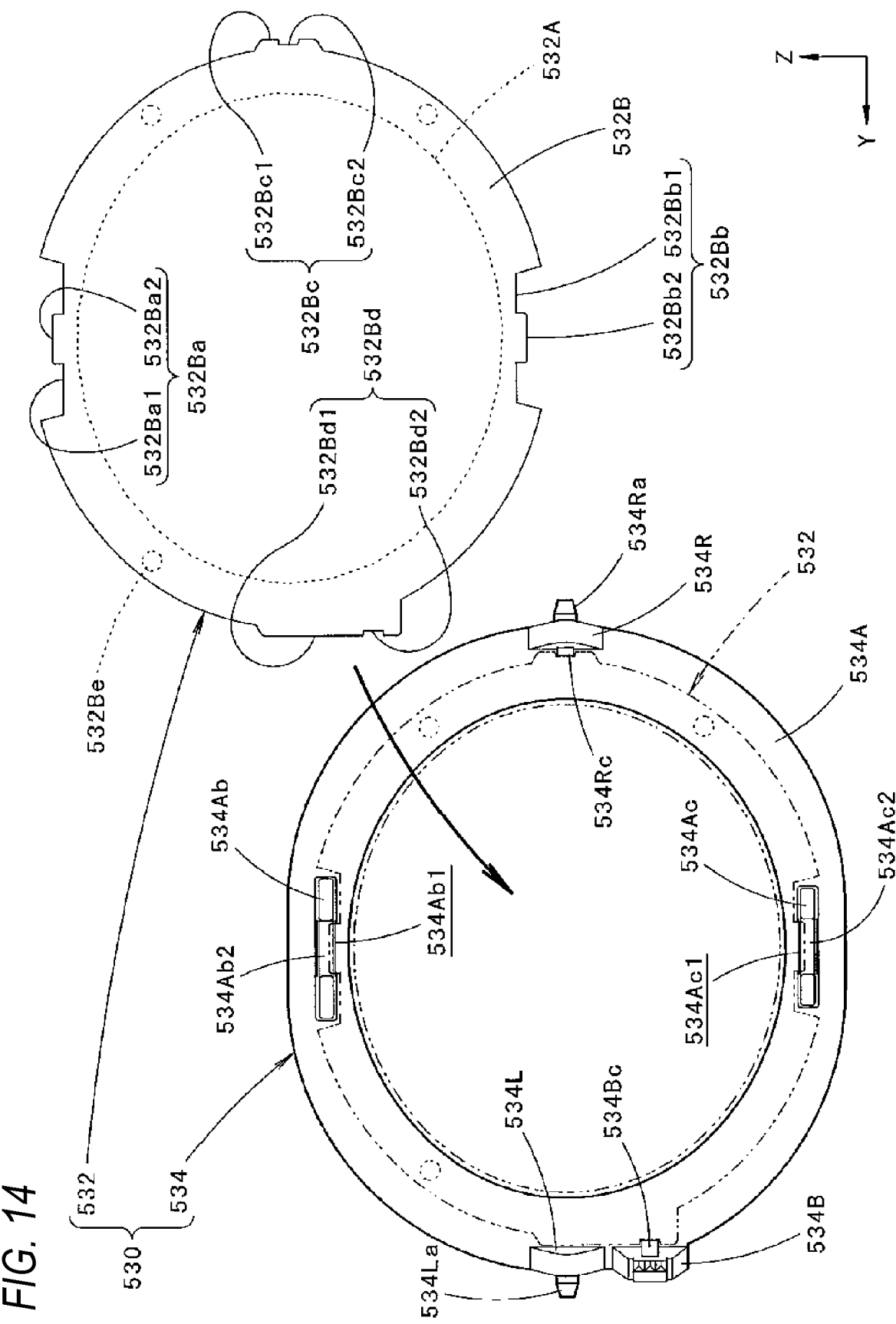
FIG. 14 is a rear view showing a state of the second embodiment where a projection lens is assembled to a lens holder.
Figure 15:
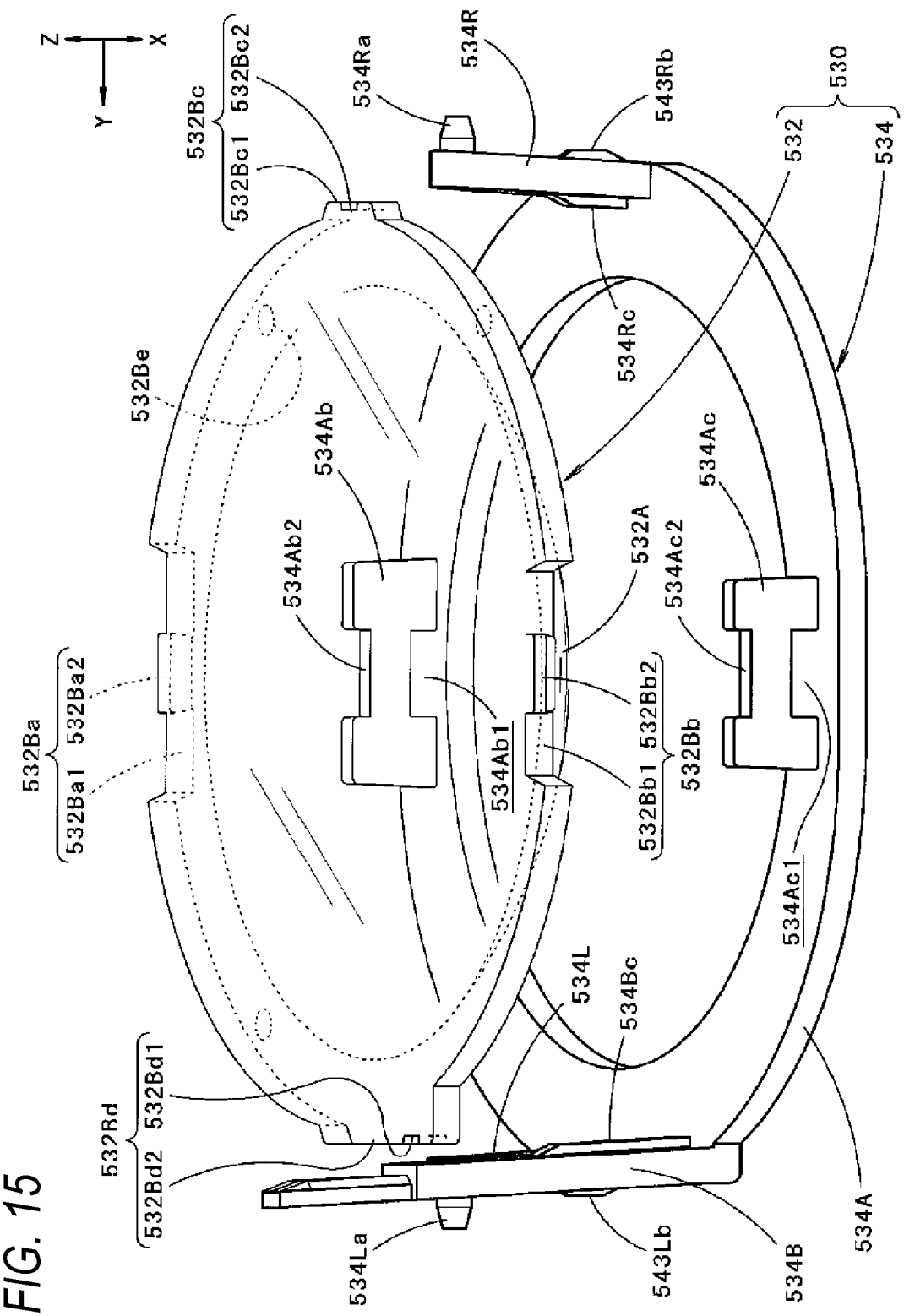
FIG. 15 is a perspective view in which the state of the assembly is viewed obliquely from a lower rear side.

FIG. 14 is a rear view showing a state where the projection lens 532 is assembled to the lens holder 534 in the light distribution control unit 530 of the present embodiment. FIG. 15 is a perspective view in which the state of such assembly is viewed obliquely from a lower rear side.

As shown in these drawings, lens fastening portions 534Ab and 534Ac are formed at two upper and lower locations of a rear surface of the body portion 534A of the lens holder 534. A positioning rib 534Rc is formed on an inner side surface of the right leg portion 534R. A positioning rib 534Bc is formed on an inner side surface of the protruding piece 534B.

As also shown in FIG. 11, the lower lens fastening portion 534Ac is formed as an H-shaped protruding portion that extends from the rear surface of the body portion 534A of the lens holder 534 toward the lamp rear side. That is, a laterally elongated rectangular lens locking hole 534Ac1 is formed in a front end portion of the lens fastening portion 534Ac. A laterally elongated rectangular guide recessed portion 534Ac2 is formed in a rear end portion of the lens fastening portion 534Ac.

The upper lens fastening portion 534Ab has the same configuration as that of the lens fastening portion 534Ac. A lens locking hole 534Ab1 and a guide recessed portion 534Ab2 are formed in the lens fastening portion 534Ab. However, a left-right width of the lens fastening portion 534Ab is set to a value larger than that of the lens fastening portion 534Ac.

The positioning rib 534Rc of the right leg portion 534R and the positioning rib 534Bc of the protruding piece 534B extend from the rear surface of the body portion 534A toward the lamp rear side. As also shown in FIG. 11, the positioning rib 534Bc extends longer than the positioning rib 534Rc.

When the positioning rib 534Rc is lengthened to the same extent as the positioning rib 534Bc, elastic deformation of the leg portion 534L is hindered when the light distribution control unit 530 is assembled to the housing 512. Therefore, the positioning rib 534Rc is formed to be shorter.

As shown in FIGS. 14 and 15, fastening engagement portions 532Ba and 532Bb are formed at two upper and lower locations of the outer peripheral surface of the outer peripheral flange portion 532B of the projection lens 532. Rib engagement portions 532Bc and 532Bd are formed at two left and right locations on the outer peripheral surface of the outer peripheral flange portion 532B.

The fastening engagement portions 532Ba and 532Bb are configured such that engagement protruding portions 532Ba2 and 532Bb2 are formed at central portions of cutout portions 532Ba1 and 532Bb1.

The engagement protruding portions 532Ba2 and 532Bb2 of the fastening engagement portions 532Ba and 532Bb have left-right widths that are slightly narrower than the lens locking holes 534Ab1 and 534Ac1 of the lens fastening portions 534Ab and 534Ac of the lens holder 534. As shown in FIG. 11, outer surfaces of portions located near the lamp front side of the engagement protruding portions 532Ba2 and 532Bb2 are formed in inclined surface shapes.

The cutout portions 532Ba1 and 532Bb1 of the fastening engagement portions 532Ba and 532Bb are slightly wider than the lens fastening portions 534Ab and 534Ac of the lens holder 534.

The right rib engagement portion 532Bc is configured such that a recessed portion 532Bc2 having the same shape as the positioning rib 534Rc of the leg portion 534R is formed in a central portion of a protruding portion 532Bc1 which is formed to be close to the inner side surface of the leg portion 534R of the lens holder 534.

The left rib engagement portion 532Bd is configured such that a recessed portion 532Bd2 having the same shape as the positioning rib 534Bc of the protruding piece 534B is formed in a lower portion of a protruding portion 532Bd1 which is formed to be close to inner side surfaces of the leg portion 534L and the protruding piece 534B of the lens holder 534.

Further, hemispherical positioning protruding portions 532Be are formed in L-shapes at three locations on a front surface of the outer peripheral flange portion 532B of the projection lens 532.

The light distribution control unit 530 is assembled by fitting the projection lens 532 to the lens holder 534 from the lamp rear side. When the projection lens 532 is fitted from above in a state where the lens holder 534 faces downward, the assembly can be easily performed.

Specifically, when the pair of upper and lower engagement protruding portions 532Ba2 and 532Bb2 of the projection lens 532 are placed along the pair of upper and lower guide recessed portions 534Ab2 and 534Ac2 of the lens holder 534, the left recessed portion 532Bd2 of the projection lens 532 naturally engages with the positioning rib 534Bc of the lens holder 534. At this time, although the right recessed portion 532Bc2 of the projection lens 532 is not yet engaged with the positioning rib 534Rc of the lens holder 534, the right recessed portion 532Bc2 is engaged with the positioning rib 534Rc when the projection lens 532 is further pushed downward in this state, and thus positioning is performed in the up-down direction and the left-right direction. The positioning protruding portions 532Be formed at the three locations on the front surface of the outer peripheral flange portion 532B of the projection lens 532 are abutted against the rear surface of the body portion 534A of the lens holder 534, so that positioning is performed in a depth direction (that is, the lamp front-rear direction).

Next, an operational effect of the present embodiment will be described.

In the vehicle lamp 510 according to the present embodiment, the lens holder 534 that supports the projection lens 532 is supported in the manner that allows the up-down direction rotation with respect to the housing 512. As a result, optical axis adjustment can be performed in the up-down direction in a state where the light emitting element 22 is fixed to the housing 512. Therefore, the vehicle lamp 510 can have a compact configuration, and the vehicle lamp 510 which is particularly suitable for a fog lamp or the like can be provided.

The vehicle lamp 510 according to the present embodiment also includes the rotationally-mounted light source unit 20. The rib 512c3 which extends toward the lamp rear side is formed on the rear wall portion 512c of the housing 512 so as to surround at least an upper half portion of the opening 512c1 which is configured to mount the light source unit 20. As a result, rainwater or high-pressure washing water during car washing can be prevented from entering a lamp chamber from a mounting portion where the light source unit 20 is mounted to the housing 512.

On the rear wall portion 512c of the housing 512, the peripheral portion of the opening 512c1 is formed as the step-up portion 512g that is displaced toward the lamp front side as compared with the other portions. As a result, a region which is located on an inner peripheral side of the rib 512c3 is displaced toward the lamp front side as compared with a region located on an outer peripheral side. The rearward protrusion amount of the rib 512c3 from the other portions of the rear wall portion 512c is set to the same value as that of the rib 12c3 of the first embodiment. As a result, the rear end surface of the rib 512c3 can be further displaced from the abutting position between the elastic seal member 28 and the front end portion 26B1 of the heat sink 26B toward the lamp rear side as compared with the first embodiment. Therefore, the rainwater or high-pressure washing water during car washing can be effectively prevented from entering the lamp chamber from the mounting portion where the light source unit 20 is mounted to the housing 512.

By adopting the configuration of the present embodiment, even though the rearward protrusion amount of the rib 512c3 is smaller than that of the rib 12c3 of the first embodiment, it is possible to obtain a water intrusion preventing effect that is equal to or higher than that of the first embodiment.

The reflective member 536 configured to reflect the external light, which has passed through the projection lens 532 and entered the internal space of the housing 512, is arranged on the lamp rear side relative to the projection lens 532. The reflective member 536 has the configuration in which the plurality of reflecting elements 536s that reflect the external light toward the projection lens 532 are formed in a portion that overlaps a peripheral edge portion of the lens body portion 532A of the projection lens 532 in the lamp front view. Therefore, the following operational effect can be obtained.

That is, when the vehicle lamp 510 is observed from the lamp front side in a non-lighting state, the internal space of the housing 512 is seen through the projection lens 532. At this time, the reflective member 536 is illuminated and seen at a plurality of locations due to the external light. Therefore, the internal space of the housing 512 can be prevented from being seen darkly even when the lamp is not lighted. As a result, visibility thereof as the vehicle lamp 510 can be improved.

The plurality of reflecting elements 536s are formed at the portion which overlaps the peripheral edge portion of the lens body portion 532A of the projection lens 532 in the lamp front view. As a result, light from the light emitting element 22 toward the projection lens 532 can be prevented from being blocked due to an arrangement of the reflective member 536.

In this way, according to the present embodiment, the visibility when the lamp is not lighted can be improved in the lens-movable vehicle lamp 510 which is configured to control the light distribution of the light from the light emitting element 22 by the projection lens 532.

In the present embodiment, the support of the projection lens 532 provided by the lens holder 534 is achieved by fitting the projection lens 532 to the lens holder 534. As a result, an assembling process of the light distribution control unit 530 can be simplified.

Further, in the present embodiment, the light emitting surface of the light emitting element 22 is arranged at the same position as the rotation axis Ax1 relative to the lamp front-rear direction. As a result, even when the light distribution control unit 530 is rotated around the rotation axis Ax1, a positional relationship between the light emitting surface of the light emitting element 22 and the projection lens 532 hardly changes. Therefore, even when optical axis adjustment is performed in the up-down direction, a fog lamp light distribution pattern can be maintained in a substantially constant shape.

The air hole (not shown) configured to absorb pressure fluctuation in the lamp chamber is formed in the left side wall portion 512b (peripheral wall portion) of the housing 512. Since the air hole is closed by the filter 50, the same operational effect as in the first embodiment can be obtained.

In the present embodiment, since the air hole 512h is also formed in the rear wall portion 512c of the housing 512, a pressure fluctuation absorbing effect in the lamp chamber can be improved. Moreover, since the air hole 512h is closed by the filter 552, waterproof performance and moisture diffusivity can be ensured.

The filter 552 is superior to the filter 50 in terms of air permeability, while the filter 50 is superior to the filter 552 in terms of waterproof performance and moisture diffusivity. Therefore, the following operational effect can be obtained.

That is, moisture generated in the lamp chamber can be efficiently discharged via the air hole 512h and the filter 552 due to convection action. Moreover, moisture remaining in the lamp chamber can be efficiently discharged via the air hole of the left side wall portion 512b and the filter 50 due to diffusing action.

In the vehicle lamp 510 according to the present embodiment, the light source unit 20 is also mounted on the rear wall portion 512c of the housing 512. The opening 512c1 configured to achieve such mounting is formed in the position obtained by displacing rightward (that is, toward the vehicle width direction inner side) from the center position of the rear wall portion 512c. The overhanging portion 512d where the optical axis adjusting screw 40 is arranged is formed at a left end portion of the rear wall portion 512c (that is, a vehicle width direction outer side end portion). As a result, a space for forming the air hole 512h can also be secured on the rear wall portion 512c of the housing 512 at an intermediate position between the step-up portion 512g and the overhanging portion 512d.

The air hole 512h is formed in the rear wall portion 512c of the housing 512 at the position above the rotation axis Ax1. As a result, the moisture generated in the lamp chamber can be efficiently discharged due to the convection action.

In the present embodiment, since the light emitting element 22 which serves as the light source is also configured as a part of the light source unit 20, a lamp configuration can be simplified.

The light source unit 20 is mounted on the housing 512 by inserting the socket 26 into the opening 512c1 formed in the rear wall portion 512c of the housing 512 and rotating the socket 26. As a result, the light emitting element 22 can be accurately positioned relative to the lamp front-rear direction.

The leg portions 534R and 534L which extend toward the lamp rear side are formed on each of two vehicle width direction end portions of the lens holder 534. The fulcrum protruding portions 534Ra and 534La are formed on the outer side surfaces of the rear end portions of the leg portions 534R and 534L, respectively. The fulcrum engagement recessed portion 512a1 and the fulcrum engagement hole 512b1 are respectively formed as the fulcrum engagement portions that engage with the fulcrum protruding portions 534Ra and 534La of the leg portions 534R and 534L at positions on the rotation axis Ax1 on the right side wall portion 512a and the left side wall portion 512b of the housing 512. As a result, a degree of freedom in a positional relationship between the rotation axis Ax1 and the projection lens 532 can be improved.

In the present embodiment, the pair of left and right leg portions 534R and 534L have the same length. The leg portion 534L located on the side of the protruding piece 534B is shorter than the leg portion 34L of the first embodiment, and the other leg portion 534R is longer than the leg portion 34R of the first embodiment. Therefore, ease of detachment from an engaged state where the leg portions 534R and 534L are engaged with the fulcrum engagement recessed portion 512a1 or the fulcrum engagement hole 512b1 is smaller than that of the leg portion 34R of the first embodiment while larger than the leg portion 34L of the first embodiment.

In this regard, in the present embodiment, the detachment prevention protruding portions 534Rb and 534Lb are formed on outer side surfaces of the pair of left and right leg portions 534R and 534L, respectively. Therefore, even when the lens holder 534 is relatively displaced in the vehicle width direction due to vehicle vibration or the like, one of the pair of left and right detachment prevention protruding portions 534Rb and 534Lb is abutted against the right side wall portion 512a or the left side wall portion 512b of the housing 512. As a result, the leg portions 534R and 534L can be prevented from being detached from the engaged state where the leg portions 534R and 534L are engaged with the fulcrum engagement recessed portion 512a1 or the fulcrum engagement hole 512b1. Therefore, the lens holder 534 can be prevented from being detached from the housing 512.

In the present embodiment, the gaps between the tip end surfaces of the detachment prevention protruding portions 534Rb and 534Lb and the inner side surfaces of the right side wall portion 512a and the left side wall portion 512b are also set to the values smaller than the insertion depths by which the fulcrum protruding portions 534Ra and 534La are respectively inserted into the fulcrum engagement recessed portion 512a1 and the fulcrum engagement hole 512b1 in the state where the fulcrum protruding portions 534Ra and 534La are respectively engaged with the fulcrum engagement recessed portion 512a1 and the fulcrum engagement hole 512b1. As a result, each of the fulcrum protruding portions 534Ra and 534La can be prevented from being detached from the state where the fulcrum protruding portions 534Ra and 534La are engaged with the fulcrum engagement recessed portion 512a1 and the fulcrum engagement hole 512b1, respectively.

The groove portion 512a2 that extends from the fulcrum engagement recessed portion 512a1 toward the lamp front side is formed in the inner side surface of the right side wall portion 512a of the housing 512. As a result, the fulcrum protruding portion 534Ra is engaged with the groove portion 512a2 when the right leg portion 534R is inserted inside the housing 512, so that the fulcrum protruding portion 534Ra can be moved toward the lamp rear side in a state of being guided in the up-down direction and be inserted into the fulcrum engagement recessed portion 512a1. Therefore, the fulcrum protruding portion 534Ra and the fulcrum engagement recessed portion 512a1 can be easily engaged.

The groove portion 512b2 that extends from the fulcrum engagement hole 512b1 toward the lamp front side is formed in the inner side surface of the left side wall portion 512b of the housing 512. As a result, the fulcrum protruding portion 534La is engaged with the groove portion 512b2 when the left leg portion 534L is inserted inside the housing 512, so that the fulcrum protruding portion 534La can be moved toward the lamp rear side in a state of being guided in the up-down direction and be inserted into the fulcrum engagement hole 512b1. Therefore, the fulcrum protruding portion 534La and the fulcrum engagement hole 512b1 can be easily engaged.

In this way, lamp assembling efficiency of the vehicle lamp 510 according to the present embodiment can also be improved.

Up-down widths of front regions of the groove portions 512a2 and 512b2 are set to values larger than up-down widths of rear regions thereof. As a result, the fulcrum protruding portions 534Ra and 534La can be easily engaged with the front regions whose up-down widths are large. The fulcrum protruding portions 534Ra and 534La can be moved toward the rear regions whose up-down widths are narrow. As a result, guidance toward each of the fulcrum engagement recessed portion 512a1 and the fulcrum engagement hole 512b1 can be easily performed. Therefore, the lamp assembling efficiency can be further improved.

Each of the groove portions 512a2 and 512b2 is formed such that the up-down width gradually increases toward the lamp front side. Therefore, the fulcrum protruding portions 534Ra and 534La engaged with the groove portions 512a2 and 512b2 can be smoothly moved toward the lamp rear side. As a result, the lamp assembling efficiency can be further improved.

A depth of the front region of each of the groove portions 512a2 and 512b2 is set to a value larger than a depth of the rear region. As a result, the fulcrum protruding portions 534Ra and 534La can be easily engaged with the front regions which are relatively deep. The fulcrum protruding portions 534Ra and 534La can be moved toward the rear regions which are relatively shallow. As a result, the guidance toward each of the fulcrum engagement recessed portion 512a1 and the fulcrum engagement hole 512b1 can be easily performed. Therefore, the lamp assembling efficiency can be further improved.

Each of the groove portions 512a2 and 512b2 gradually deepens toward the lamp front side. Therefore, the fulcrum protruding portions 534Ra and 534La engaged with the groove portions 512*a*2 and 512*b*2 can be smoothly moved toward the lamp rear side along the groove portions 512*a*2 and 512*b*2. As a result, the lamp assembling efficiency can be further improved.

In the present embodiment, the support of the projection lens 532 provided by the lens holder 534 is achieved by fitting the projection lens 532 to the lens holder 534. As a result, the assembling process of the light distribution control unit 530 can be simplified.

Although each reflecting element 536*s* is formed as the triangular pyramid recessed portion in the second embodiment, the present invention is not limited thereto. Each reflecting element 536*s* may also be formed as a recessed portion having another shape (for example, a conical recessed portion or a groove shaped recessed portion). Moreover, each reflecting element 536*s* does not necessarily have to be formed in a regular shape.

Although the reflective member 536 is formed of the opaque member in the second embodiment, the present invention is not limited thereto. The reflective member 536 may also be formed of a transparent member, and reflection of the external light performed by the plurality of reflecting elements may also be achieved by total reflection.

Although the light distribution control unit 530 has a configuration in which the projection lens 532 is supported by the lens holder 534 in the second embodiment, the present invention is not limited thereto. The projection lens 532 and the lens holder 534 can also be integrally molded by two-color molding, and the lens holder 534 may also be a transparent member that is molded integrally with the projection lens 532.

Numerical values shown as specifications in the above embodiments and the modifications thereof are merely examples, and these values may be set to different values as appropriate.

The present disclosure is not limited to the configurations described in the above embodiments and the modifications thereof, and a configuration added with various other changes may be adopted.

The present application is based on Japanese Patent Application No. 2018-105810 filed on Jun. 1, 2018, Japanese Patent Application No. 2018-105811 filed on Jun. 1, 2018, Japanese Patent Application No. 2018-105812 filed on Jun. 1, 2018, Japanese Patent Application No. 2018-105813 filed on Jun. 1, 2018, Japanese Patent Application No. 2018-105814 filed on Jun. 1, 2018 and Japanese Patent Application No. 2018-105815 filed on Jun. 1, 2018, the contents of which are incorporated herein by reference.

The invention claimed is:

1. A vehicle lamp comprising:
   a light source unit which includes a light emitting element, a board where the light emitting element is mounted, a socket configured to support the board, and an elastic seal member mounted on a front end portion of the socket;
   a projection lens configured to control light distribution of light from the light emitting element;
   a lens holder configured to support the projection lens; and
   a housing configured to support the lens holder such that the lens holder is rotatable around a rotation axis extending in a vehicle width direction,
   wherein the light source unit is mounted to the housing in a state where the socket is inserted into an opening formed in a rear wall portion of the housing while the elastic seal member is pressed against the rear wall portion, and
   wherein a rib which extends toward a lamp rear side is formed on the rear wall portion of the housing so as to surround at least an upper half portion of the opening.

2. The vehicle lamp according to claim 1, wherein the rib surrounds an entire circumference of the opening, and a cutout portion is formed in a lower end portion of the rib.

3. The vehicle lamp according to claim 1, wherein the rib extends to the lamp rear side relative to a position where the elastic seal member is pressed against the rear wall portion of the housing.

4. The vehicle lamp according to claim 1,
   wherein the light source unit is mounted to the housing by rotating the socket which is inserted into the opening, and
   wherein a mark indicating a predetermined mounting position of the light source unit is formed on an outer peripheral surface of the rib.

5. The vehicle lamp according to claim 1, wherein a region, which is located on an inner peripheral side of the rib, of the rear wall portion of the housing is displaced to a lamp front side with respect to a region located on an outer peripheral side.

6. A vehicle lamp comprising:
   a projection lens configured to control light distribution of light from a light source;
   a lens holder configured to support the projection lens;
   a housing configured to support the lens holder such that the lens holder is rotatable around a rotation axis extending in a vehicle width direction; and
   a translucent cover supported by the housing,
   wherein an air hole is formed in a peripheral wall portion of the housing so as to absorb pressure fluctuation in a lamp chamber formed by the housing and the translucent cover,
   wherein the air hole is formed in a side wall portion on a vehicle width direction inner side of the housing,
   wherein the lens holder includes a pair of left and right fulcrum protruding portions formed at positions on the rotation axis,
   wherein the housing includes a pair of left and right fulcrum engagement portions which are formed at positions on the rotation axis on left and right side wall portions thereof and configured to engage with the pair of left and right fulcrum protruding portions, and
   wherein the fulcrum engagement portion formed on a side wall portion located on the vehicle width direction inner side among the left and right side wall portions is configured as a fulcrum engagement hole which penetrates the side wall portion in the vehicle width direction.

7. The vehicle lamp according to claim 6 further comprising:
   a light source unit which includes a light emitting element serving as the light source, a board where the light emitting element is mounted, and a socket configured to support the board,
   wherein the light source unit is mounted on a rear wall portion of the housing.

8. The vehicle lamp according to claim 6, further comprising:
   a filter which is mounted on the side wall portion located on the vehicle width direction inner side of the housing so as to close the air hole and the fulcrum engagement hole,
   wherein the filter is waterproof and moisture diffusive.

9. The vehicle lamp according to claim 8,
wherein an annular bead portion is formed on the side wall portion located on the vehicle width direction inner side of the housing, and a region located on an inner peripheral side of the annular bead portion on the side wall portion is formed as a flat portion, and
wherein the air hole and the fulcrum engagement hole are formed in the flat portion while the filter is mounted thereto.

10. The vehicle lamp according to claim 9,
wherein the filter is formed in a sheet shape, and
wherein a height of the annular bead portion is set to have a value larger than a thickness of the filter.

11. The vehicle lamp according to claim 8, wherein the filter is made of expanded polytetrafluoroethylene.

12. A vehicle lamp comprising:
a light source unit which includes a light emitting element, a board where the light emitting element is mounted, a socket configured to support the board, and an elastic seal member mounted on a front end portion of the socket;
a projection lens configured to control light distribution of light from the light emitting element;
a lens holder configured to support the projection lens; and
a housing configured to support the lens holder such that the lens holder is rotatable around a rotation axis extending in a vehicle width direction,
wherein the light source unit is mounted on the housing by inserting the socket into an opening formed in a rear wall portion of the housing and rotating the socket, and
wherein the housing is provided with a reverse rotation prevention structure which is configured to abut against the socket so as to prevent the light source unit from rotating in a loosening direction from a predetermined mounting position.

13. The vehicle lamp according to claim 12,
wherein the light emitting element has a configuration in which a plurality of white light emitting diodes are arranged adjacent to each other, and
wherein the light emitting element is configured such that a light emitting surface of the light emitting element extends laterally when the light source unit rotates to the predetermined mounting position.

14. The vehicle lamp according to claim 12, wherein the reverse rotation prevention structure includes an abutting member configured to abut against the socket, and a fastening member configured to fasten the abutting member to the rear wall portion of the housing.

15. The vehicle lamp according to claim 14,
wherein the socket includes a socket body, and a heat sink fixed to the socket body,
wherein abutment of the abutting member against the socket is performed with respect to the heat sink.

16. The vehicle lamp according to claim 14, wherein the fastening member is formed of a screw.

17. The vehicle lamp according to claim 15,
wherein the abutting member includes a fastening portion fixed to the rear wall portion of the housing, and a pair of arm portions extending from the fastening portion, and
wherein in a state where the fastening portion is fastened to the rear wall portion of the housing, a tip end surface of the pair of arm portions of the abutting member is abutted against or close to the heat sink.

18. The vehicle lamp according to claim 17,
wherein the heat sink includes a front end portion which is formed in a disk shape, and a plurality of heat dissipating fins which extend on an outer peripheral surface of the front end portion in a band shape toward the lamp rear side, the front end portion of the heat sink being fixed to the socket body, and
wherein the being abutted against or close to of the tip end surface of the pair of arm portions with respect to the heat sink is performed with respect to a pair of heat dissipating fins which are located at a peripheral direction end portion among the plurality of heat dissipating fins.

* * * * *